United States Patent

Takeda et al.

[11] Patent Number: 6,055,218
[45] Date of Patent: *Apr. 25, 2000

[54] RECORDING MEDIUM HAVING TRACK FORMED OF LAND PORTION AND GROOVE PORTION, AND REPRODUCING APPARATUS THEREFOR

[75] Inventors: Toru Takeda, Saitama; Akira Shimazu, Kanagawa; Shinichi Yamamura, Tokyo; Katsuhiro Seo, Kanagawa, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,256

[22] Filed: Oct. 20, 1997

[30] Foreign Application Priority Data

Oct. 21, 1996 [JP] Japan .................................. 8-278204

[51] Int. Cl.$^7$ ........................................................ G11B 7/00
[52] U.S. Cl. ................................. 369/44.28; 369/44.26; 369/275.3; 369/275.4
[58] Field of Search ............................. 369/44.27, 44.28, 369/44.25, 44.26, 275.3, 275.4, 47, 48, 50, 54, 58

[56] References Cited

U.S. PATENT DOCUMENTS 5,422,874  6/1995  Birukawa et al. ................... 369/275.2
5,566,141  10/1996  Yamaguchi et al. ...................... 369/32

FOREIGN PATENT DOCUMENTS

0740291 A2  10/1996  European Pat. Off. ........ G11B 7/007
9-120584    5/1997   Japan .............................. G11B 7/24
10-27354    1/1998   Japan ............................. G11B 7/085

OTHER PUBLICATIONS

Patent Abstracts of Japan, JP 6–084172 Published Mar. 25, 1994, Matsushita Electric Inc. Co. Ltd.
Patent Abstracts of Japan, JP–8–111036 Published Apr. 30, 1996, Fuji Xerox Co. Ltd.
Patent Abstracts of Japan, JP 8–096417 Published Apr. 12, 1996, NEC Corp.

*Primary Examiner*—Paul W. Huber
*Attorney, Agent, or Firm*—Limbach & Limbach L.L.P.

[57] ABSTRACT

An optical reproducing apparatus according to the present invention includes a land/groove switching circuit for alternately switching reproduction of a record mark on a groove portion and a land portion. This allows a tracking operation to be carried out continuously at a connection point to a subsequent track in the recording direction without a laser beam from an optical pickup passing through an end of a spiral track. A recording medium according to the present invention includes a recording track formed of a groove portion and a land portion, and a record mark used for switching a tracking operation so that a light beam emitted from the optical pickup should be irradiated alternately on the groove portion and the land portion. When the record mark is detected, a track jump operation is carried out, and information is reproduced from the groove portion and the land portion alternately.

57 Claims, 12 Drawing Sheets

RECORDING MEDIUM HAVING TRACK FORMED OF LAND PORTION AND GROOVE PORTION, AND REPRODUCING APPARATUS THEREFOR

BACKGROUND OF THE INVENTION

1. Field of the Invention

The present invention relates to a mass storage device for information processing, video disk recorders for home use and the like and, more particularly, to an optical reproduction device, a recording medium and a method of tracking used for recording and reproducing data on and from, for example, a digital video disk (DVD) as an optical disk recording and reproducing apparatus utilizing an optical beam.

2. Description of the Related Art

The advance of multi-media oriented toward an advanced information society has resulted in a need for optical disks having higher performance and larger capacities. Such optical disks can be generally classified based on the functions and usages thereof into three types, i.e., a read-only optical disk used only for reproducing information data recorded at the time of disk cutting, a write-once type optical disk which allows recording only once and allows no rewriting, and a rewritable optical disk which can be rewritten many times.

Especially, in the case of the rewritable optical disks which allow rewriting of information and data, the need for larger capacities has made it impossible to meet a required recording capacity by using only a groove recording method wherein information data are recorded only in a groove portion comprised of a groove spirally provided on the surface of an optical disk, and therefore a land-groove recording method has been employed wherein information data are recorded also on a region referred to as a land portion provided between the groove portions.

That is, in an optical disk recording and reproducing apparatus, in order to record information data on a predetermined track on an optical disk, an optical pick-up must be moved onto a target track on the optical disk to irradiate the target track with a laser beam. In order to do this, the optical pick-up must be positioned on the target position. Servo systems for moving an optical pick-up to a target position of an optical disk in the radial direction thereof include a tracking servo system.

A tracking servo system comprises a tracking coil and a tracking servo circuit included in an actuator system in an optical pick-up. The actuator system allows an optical pick-up to carry out a tracking operation accurately by means of, for example, a dual spindle actuator.

A track is tracked and the address of the same is read by means of a laser beam that traces the same, and fine seeking is performed in accordance with a difference between the address and a target address to that extent. Since an excessive eccentric speed makes it difficult to control the seek in a stable manner, the target track is finally reached after waiting until the eccentric speed is sufficiently reduced, and a recording operation is performed using land-groove recording wherein information and data are recorded on land portions between groove portions on an optical disk.

FIG. 1 shows a double-spiral groove on an optical disk used for a conventional land-groove recording method.

In FIG. 1, there is formed a groove G that constitutes one spiral guide groove extending from the inner circumference of an optical disk 110 to the outer circumference thereof. There is also formed a land L between the adjacent grooves G.

To record a recording mark on the groove G and land L on such optical disk 110, the recording mark is first recorded sequentially on the groove G from the inner circumference of the optical disk, i.e., on a track 1, a track 3, a track 5, a track 7, and so on with a record or address given and, when the recording is completed out to the outer circumference, the record mark is provided sequentially on the land L from the inner circumference of the optical disk, i.e., on a track 2, a track 4, a track 6, and so on with a record or address, up to the outer circumference where the recording is completed.

FIG. 2 shows a single spiral groove on an optical disk used in the conventional land-groove recording method.

In FIG. 2, there is formed grooves G that constitute a plurality of guide grooves that extend in the form of a spiral from the inner circumference of an optical disk 120 to the outer circumference thereof and terminate at each turn of the optical disk, i.e., at each 360 degrees. Lands L are formed between adjacent grooves G.

To record a recording mark on the grooves G and lands L on such an optical disk 120, the record mark is provided sequentially from the inner circumference of the optical disk toward the outer circumference where the recording is completed, i.e., on a track 1 for the groove G, a track 2 for the land L, a track 3 for the groove G, a track 4 for the land L, a track 5 for the groove G, a track 6 for the land L, a track 7 for the groove G, and so on with a record or address given.

In the case of an optical reproduction apparatus that utilizes the conventional double-spiral groove as shown in FIG. 1, the track 1, track 3, track 5, track 7 and so on are recorded in this order for the groove G up to the outer circumference, and about the land L, the track 2, track 4, track 6 and so on are continuously recorded on sequentially in this order again from the inner circumference. This is difficult to use in cases where continuous recording is required and intermittent recording is prohibited as in the case of the recording of video data. In addition, to record such video data, first video data must continuously be recorded in the grooves G and then the video data must be continuously recorded on the lands L, thereby the video data are continuously recorded on both of the groove G and the land L. This has resulted in a problem in that a buffer having a large capacity is required for temporary storage of data in order to prevent the continuous data from being interrupted during the movement of an optical pick-up from the groove G to the land L.

Further, in the case of an optical reproduction apparatus utilizing the conventional single-spiral groove as shown in FIG. 2, the recording on the track 1 for the groove G is continuously followed by the recording on the track 2 for the land L. The grooves G and the lands L must be molded such that they terminate at each turn of the optical disk, and this has resulted in a problem in that the manufacture of the optical disk 120 itself has a technical difficulty encountered in the process of molding the disk.

SUMMARY OF THE INVENTION

In view of such aspects, it is an object of the present invention to provide an optical reproducing apparatus and a recording medium which allow a record mark to be continuously recorded on a land portion and a groove portion alternately when a land-groove recording method is used.

According to a first aspect of the present invention, an optical reproducing apparatus for moving an optical pickup relative to a recording medium having a recording track formed of a groove portion formed of a groove spirally formed on a recording surface and a land portion located between adjacent groove portions to position the optical pickup at a target track position and for irradiating a light beam from the optical pickup on the recording medium to thereby reproduce information recorded on the groove portion and the land portion on the recording medium, includes a record mark detecting means for detecting a record mark formed on the groove portion or the land portion, and a tracking means for irradiating the light beam on either of the groove portion and the land portion which are alternately switched in response to detection of the record mark.

According to a second aspect of the present invention, a recording medium which has a recording track formed of a groove portion formed of a groove spirally formed on a recording surface and a land portion located between adjacent groove portions and which is used to record and reproduce information by positioning an optical pickup at a target track position to irradiate a light beam from the optical pickup on the recording medium, includes a record mark used to change over a tracking operation so that the light beam should be irradiated on the groove portion or the land portion.

According to a third aspect of the present invention, a tracking method used for recording or reproduction on a recording medium having a recording track formed of a groove portion formed of a groove spirally formed on a recording surface and a land portion located between adjacent groove portions, includes a step of detecting a record mark formed on the groove portion or the land portion, and a step of carrying out tracking by alternately irradiating the light beam on either of the groove portion or the land portion.

BRIEF DESCRIPTION OF THE DRAWINGS

FIGS. 5A and 5B are diagrams showing a tracking operation using a push-pull method of an optical disk recording and reproducing apparatus according to the present invention, wherein FIG. 5A is a view showing a land and a groove on an optical disk and FIG. 5B is a view showing a tracking error signal;

FIGS. 7A to 7C are diagrams showing the operation of the first optical disk recording and reproducing apparatus according to the present invention, in which FIG. 7A shows a waveform of a current for driving a one-track jump, FIG. 7B shows a waveform of reproduction data FIG. 7C shows a locus of track.

FIGS. 9A to 9C are diagrams showing the operation of the second optical disk recording and reproducing apparatus according to the present invention, wherein FIG. 9A shows a waveform of a current for driving a one-track jump and FIG. 9B shows a waveform of reproduction data; and FIG. 9C shows a locus of tracks;

FIGS. 11A and 11B are showing a double spiral groove on the optical disk according to an present invention, wherein FIG. 11A is a diagram showing the formation of the double spiral grooves, and FIG. 11B is a diagram showing track position information; and FIGS. 12A and 12B are diagrams showing a single spiral groove on another optical disk according to the present invention including transition regions at the ends of the groove, wherein FIG. 12A is a view showing the formation of the single spiral groove and the transition region and FIG. 12B is a view showing track position information.

DESCRIPTION OF THE PREFERRED EMBODIMENTS

A recording medium having a track formed of a land portion and a groove portion and a reproducing apparatus therefor according to an embodiment of the invention will now be described with reference to the accompanying drawings. An optical disk to which the present invention is applied is a digital versatile disk (DVD). There are several families of DVDs including a DVD-ROM used only for reproduction, a DVD-R which allows data to be written therein only once, and a rewritable DVD-RAM.

The preferred embodiment (hereinafter "the embodiment") of the present invention is applied to a rewritable DVD-RAM among the DVDS. The concept of the DVD-RAM will be briefly described. A phase-change type recording thin film is used which accommodates phase-change recording wherein a crystallographic phase change is caused in the structure by heating the same by means of irradiation with a laser beam to record or erase information and wherein the information is reproduced by detecting changes in reflectivity originating from a difference between the optical constants of the phases. The optical disk is a laminated element having a diameter of 120 [mm] and a thickness of 0.6 [mm]. The numerical aperture NA of the objective lens is 0.6. The wavelength of the laser is 650 or 680 [nm]. The modulation and the error correction code ECC are 8/16 modulation and a Reed-Solomon product code. The data rate is 10 [Mbit/s] or more.

Figure 3:
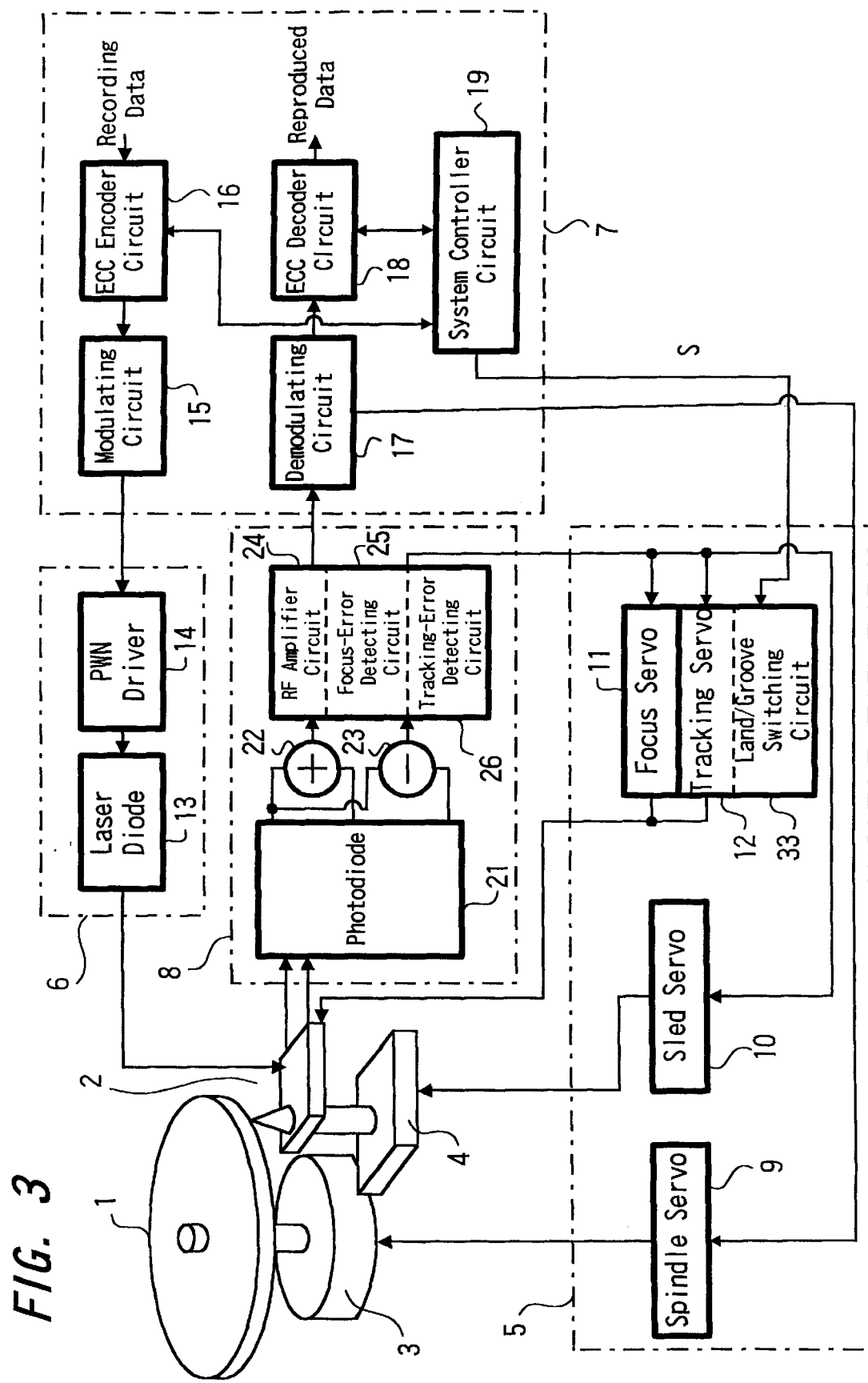
FIG. 3 is a block diagram showing a configuration of an optical disk recording and reproducing apparatus according to the present invention.

Next, a configuration of the present mode of carrying out the invention applied to such an optical disk will now be shown. FIG. 3 is a block diagram showing a configuration of an optical disk recording and reproducing apparatus according to the embodiment of the present invention.

The configuration of the optical disk recording and reproducing apparatus will be first described. The optical disk recording and reproducing apparatus according to the embodiment includes a servo control circuit 5 for controlling a servo system for each of a system for driving and controlling the rotation of an optical disk, a system for driving and controlling coarse feeding and a system for controlling an optical pick-up, a laser control circuit 6 for controlling laser power supplied to an optical pick-up 2, an I–V conversion matrix circuit 8 to obtain a reproduction RF signal, a focus error signal and a tracking error signal from a reflected laser beam, and a signal control circuit 7.

The system for driving and controlling the rotation of an optical disk includes a spindle servo circuit 9, and a spindle motor 3. The optical disk 1 constitutes a recording medium.

The system for driving and controlling coarse feeding includes a sled servo circuit 10 and a sled motor 4. The system for controlling an optical pick-up includes the optical pick-up 2, the I–V conversion matrix circuit 8, a focus servo circuit 11, a tracking servo circuit 12 and the laser control circuit 6. The I–V conversion matrix circuit 8 includes a photodiode 21 which detects a reflected laser beam from the optical disk 1 on a split surface, an adder 22 for adding the two split signals, a subtracter 23 for performing subtraction between the two split signals, an RF amplifier circuit 24 for amplifying a reproduction RF signal output by the adder 22 and supplying a servo signal to the sled servo circuit 10, a focus error detection circuit 25 for detecting a focus error signal from output of the subtracter 23, and a tracking error detection circuit 26 for detecting a tracking error signal from the output of the subtracter 23. The laser control circuit 6 includes a PWM driver 14 for performing pulse width modulation on laser light and a laser diode 13 for emitting the laser light.

The signal control circuit 7 includes a system control circuit 19 for controlling each part of the apparatus, an ECC encode circuit 16 for adding an error correction code in the form of a Reed-Solomon product code to recorded data, a modulation circuit 15 for performing 8/16 modulation on the recorded data added with the error correction code on an EFM-plus basis, a demodulation circuit 17 for converting reproduced data (RF signal) into binary reproduced data to 8/16 modulate the binary reproduced data on an EFM-plus basis and for supplying a servo signal to the spindle servo circuit 9, and an ECC decode circuit 18 for performing an error correction process on the reproduced data using a Reed-Solomon product code and for outputting the reproduced data.

In this example, the tracking servo circuit 12 also includes a land-groove switching circuit 33 which switches the tracking between a land portion and a groove portion each time the disk 1 makes one turn and which is configured such that the setting for generating timing for switching can be switched by a setting signal S from the system control circuit 19.

Next, connections in the optical disk recording and reproducing apparatus will be described. First, connections associated with the system for driving and controlling the rotation of an optical disk will be described. The spindle servo circuit 9 is connected to the spindle motor 3, and the spindle motor 3 is connected to the optical disk 1 through a rotating mechanism.

Next, connections associated with the control system for driving coarse feeding will be described. The sled servo circuit 10 is connected to the sled motor 4, and the sled motor 4 is connected to the optical pick-up 2 of the optical pick-up control system through a mechanism for coarse feeding.

Next, connections associated with the optical pick-up control system will be described. The optical pick-up 2 includes the photodiode 21 of the I–V conversion matrix circuit 8 and the two split outputs of the photodiode 21 are connected to the adder 22 and the subtracter 23. The adder 22 and the subtracter 23 are in turn connected to the RF amplifier circuit 24, and also to the focus error detection circuit 25 and the tracking error detection circuit 26.

Further, the focus error detection circuit 25 and the tracking error detection circuit 26 are connected to the focus servo circuit 11 and the tracking servo circuit 12, and the focus servo circuit 11 and the tracking servo circuit 12 are in turn connected to a focus coil and a tracking coil which are not shown on the optical pick-up 2 of FIG 3.

Next, connections associated with the signal processing system will be described. The RF amplifier circuit 24 is connected to the demodulation circuit 17 of the signal control circuit 7, and the demodulation circuit 17 is connected to the ECC decode circuit 18. The ECC encode circuit 16 is connected to the modulation circuit 15, and the modulation circuit 15 is connected to the PWM driver 14 of the laser control circuit 6, and the PWM driver 14 is connected to the laser diode 13. The laser diode 13 is provided to form a predetermined laser beam at the optical pick-up 2.

In this example, the tracking servo circuit 12 also includes the land-groove switching circuit 33 which switches the tracking between the land portion and the groove portion each time the disk 1 makes one turn and which has a function of switching the setting for generating timing for switching in accordance with the setting signal S from the system control circuit 19.

Further, the optical disk recording and reproducing apparatus is connected to a host computer through the system control circuit 19 and an interface circuit which is not shown.

The operation of the optical disk recording and reproducing apparatus having such a configuration will now be described. When the optical disk recording and reproducing apparatus performs recording or reproduction of an information signal according to an instruction from the host computer which is not shown, the optical pick-up 2 is positioned at a target track position on the optical disk 1 in response to the host computer after a seek operation utilizing the sled motor 4 and, thereafter, the tracking servo circuit 12 and the focus servo circuit 11 drive the tracking coil and the focus coil to perform fine adjustment of the tracking and focus such that the optical beam spot is pinpointed at the target track position.

For recording, the laser control circuit 6 sets the laser power at an erase power level in advance to erase the information at regions where recording is not performed and adjusts the laser power to a write power level to record the information signal at the target track position. For reproduction, the laser control circuit 6 adjusts the laser power to a read power level to reproduce the information signal recorded at the target track position.

In the signal control system, the system control circuit 19 first supplies a command instructing rotation to the spindle servo circuit 9 of the servo control circuit 5 based on the host computer. The spindle servo circuit 9 supplies a drive signal to the spindle motor 3 according to this command to cause the spindle motor 3 to rotate. A servo signal detected from the reproduced RF signal in synchronization therewith by the demodulation circuit 17 is supplied to the spindle servo circuit 9.

Next, the system control circuit 19 supplies a command instructing coarse feeding to the sled servo circuit 10 according to the host computer. The optical pick-up 2 reads the information signal at the current position on the optical disk 1 and supplies an RF signal, an addition signal and a subtraction signal to the RF amplifier circuit 24, the focus error detection circuit 25 and the tracking error detection circuit 26 through the photodiode 21, the adder 22 and the subtracter 23. The tracking error detection circuit 26 generates a tracking error signal from a differential signal and supplies it to the sled servo circuit 10. The sled servo circuit 10 generates a drive signal based on the tracking error signal and supplies the drive signal to the sled motor 4. Based on the drive signal, the sled motor 4 causes the optical pick-up 2 to perform a coarse seek operation through the mechanism for coarse feeding not shown.

The operation of the seek servo system originates from two systems, i.e., the system of the sled motor 4 and the system of the actuator in the optical pick-up 2. The system of the sled motor 4 causes the optical pick-up 2 to perform a coarse seek operation through the sled motor 4 and performs positioning by detecting a position by means of an encoder which is not shown. The system of the actuator causes the optical pick-up 2 to perform a fine seek operation through a double spindle actuator utilizing a tracking coil which is not shown.

The operational sequence of such a seek servo system will now be described. First, the coarse seek operation is performed to approach the target track position. Even when the optical pick-up 2 stops near the target address after the coarse seek, the movable portions of the actuator in the optical pick-up 2 do not stop immediately and they vibrate and stop after a predetermined settling time.

Then, a track pull-in operation is performed to read the information in the address thus reached. Since the track pull-in operation is likely to cause an error if it is performed when the track eccentric speed is high, this operation is performed after the eccentric speed approaches zero.

Then, the laser beam traces the track. The tracking coil is driven by the drive signal from the tracking servo circuit 11 to perform on-track tracking to thereby read the address. The system controller circuit 19 reads out an address and calculates a difference between the address and the target address, thereby carrying out a fine seeking operation by an amount corresponding to the difference. At this time, the optical pickup 2 reads the information signal at the current position from the optical disk 1 and supplies it through the demodulating circuit 17 to the system controller circuit 19.

At this time, the photodiode 21 receives the laser beam reflected by the optical disk 2 on its two split surfaces. The photodiode 21 converts the two split laser beams thus received into electrical signals and supplies them to the subtracter 23. The subtracter 23 performs subtraction between the two split signals to generate a differential signal. The tracking error detection circuit 26 generates a tracking error signal from the differential signal and supplies it to the tracking servo circuit 12. Based on the tracking error signal, the tracking servo circuit 12 performs tracking of the optical pick-up 2 using the tracking coil of the double spindle actuator which is not shown. Further, the focus error detection circuit 25 detects a focus error signal from the information signal and supplies it to the focus servo circuit 11. Based on the focus error signal, the focus servo circuit 11 performs focusing of the optical pick-up 2 using the focus coil of the double spindle actuator which is not shown.

In this case, it is also difficult to control the seek in a stable manner if the eccentric speed is too high. Therefore, the target track is finally reached after the eccentric speed becomes low enough to execute the recording or reproducing operation.

The recording or reproducing operation is performed as follows after the optical pick-up 2 is positioned at the target track position. For reproduction, the system control circuit 19 supplies a reproduction command to the PWM driver 14 of the laser control circuit 6. The PWM driver 14 adjusts the laser emission power to a power level for reproduction which is supplied to the laser diode 13. The laser diode 13 irradiates the optical disk 1 with a laser beam through a lens. The photodiode 21 receives the laser beam reflected by the optical disk 2 on its two split surfaces. The photodiode 21 converts the received two split laser beams into electrical signals and supplies them to the adder 22. The adder 22 adds the two split signals to generate a reproduction RF signal.

The reproduction RF signal is supplied to the RF amplifier circuit 24. The RF amplifier circuit 24 supplies the reproduction data to the demodulation circuit 17 after performing RF amplification on it. The demodulation circuit 17 performs 8/16 demodulation on the reproduction data on an EFM-plus basis. The demodulation circuit 17 supplies the demodulated reproduction data to the ECC decode circuit 18. The ECC decode circuit 18 performs an error correction process on the reproduction data using a Reed-Solomon product code and outputs the reproduction data. The decoded information signal is supplied to the host computer.

For recording, the system control circuit 19 supplies a recording command to the PWM driver 14 of the laser control circuit 6. Data to be recorded supplied by the host computer is supplied to the ECC encode circuit 16. The ECC encode circuit 16 adds an error correction code in the form of a Reed-Solomon product code to the data to be recorded. The ECC encode circuit 16 supplies the data to be recorded and added with the error correction code to the modulation circuit 15. The modulation circuit 15 performs 8/16 modulation on the data to be recorded and added with the error correction code on an EFM-plus basis. The modulation circuit 15 supplies the modulated data to be recorded to the PWM driver 14 of the laser control circuit 6. The PWM driver 14 performs pulse width modulation on the data to be recorded which has been subjected to 8/16 modulation based on the recording command to supply a laser emission signal at a write power level to the laser diode 13. The laser diode 13 irradiates the optical disk 1 with a laser beam through the lens. The recording thin film of the optical disk 1 is heated by the laser beam to become amorphous in which state the data to be recorded is recorded at the target track position.

It is notable that the optical disk recording and reproducing apparatus according to the embodiment includes the land-groove switching circuit 33 which is configured to supply one-track jump pulses to the tracking servo circuit 12 such that the tracking of optical pick-up 2 occurs on the groove portion and the land portion alternately each time the optical disk 1 makes one turn.

Figure 4:
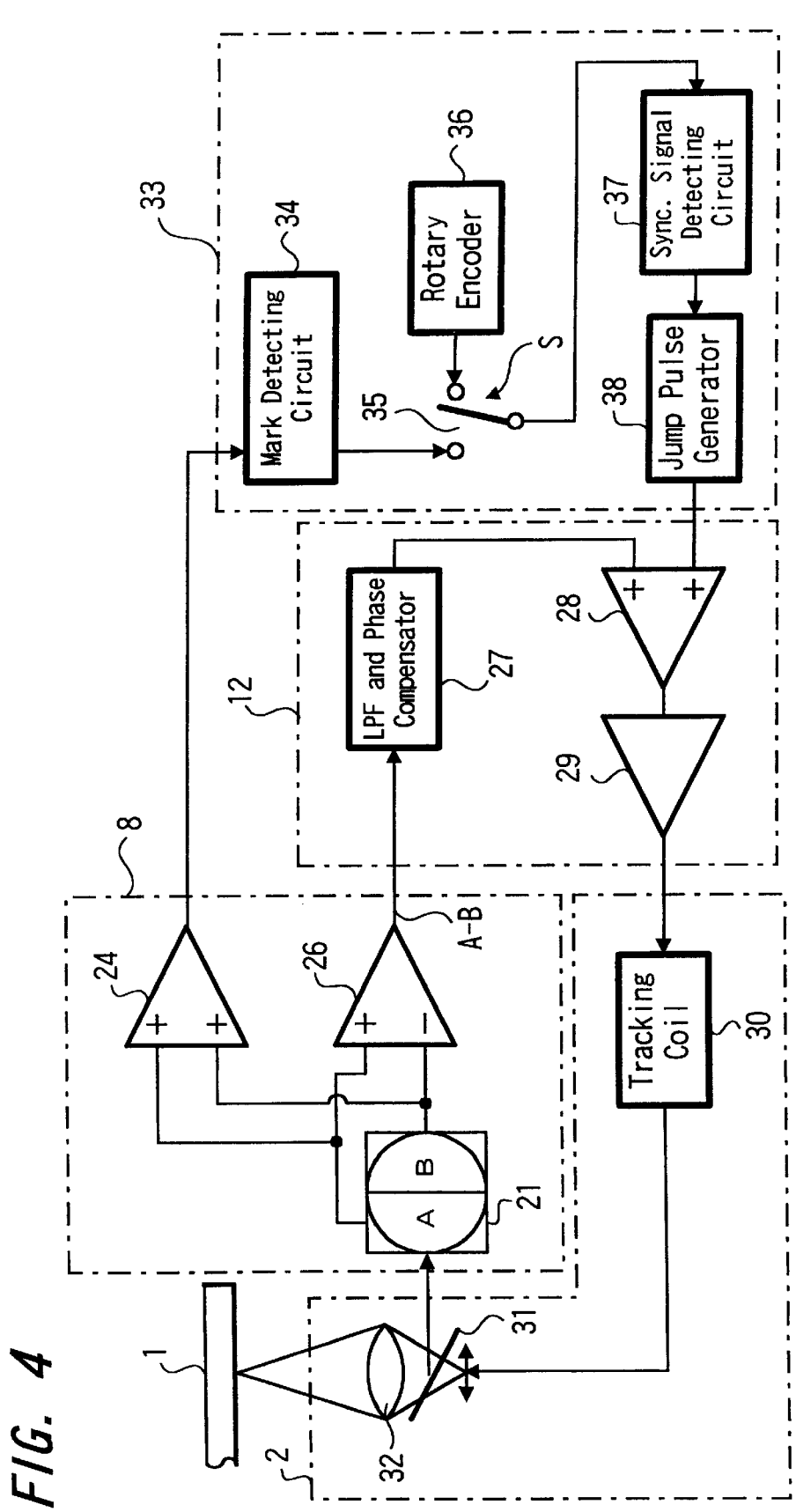
FIG. 4 is a diagram showing a configuration of a tracking servo system of an optical disk recording and reproducing apparatus according to the present invention.

There will be described with reference to FIG. 4 the configuration of the tracking servo system of the optical disk recording and reproducing apparatus according to the embodiment which is configured and operated as described above. As shown in FIG. 4, this tracking servo system includes the optical pick-up 2, the I–V conversion matrix circuit 8, the tracking servo circuit 12 and land-groove switching circuit 33. The optical pick-up 2 includes a tracking coil 30 which forms a part of the double spindle actuator, a lens 32 for forming a laser beam which can be fine-adjusted by the tracking coil 30 in the direction of the tracks and a beam splitter 31 for splitting only beams reflected by the optical disk 1.

Further, the I–V conversion matrix circuit 8 in this tracking servo system includes the photodiode 21 which has two split light receiving surfaces A and B split in the direction of the tracks on the optical disk 1 and detects a beam reflected by the optical disk 1 that comes from the beam splitter 31, the tracking error detection circuit 26 for inputting the signals from the two split light receiving surfaces A and B of the photodiode 21 to a non-inverting input (+) and an inverting input (−) of a differential amplifier circuit and for detecting a differential signal A−B as a tracking error signal, and the RF amplifier circuit 24 for inputting the signals from the two split light receiving surfaces A and B of the photodiode 21 to one input (+) and another input (+) of an adding circuit and for detecting a sum signal A+B as an RF reproduction signal.

The land-groove switching circuit 33 includes a mark detection circuit 34 for detecting a mark provided in one location on the optical disk 1 for detecting the starting position of one-track jumps from the RF signal of RF amplifier circuit 24 so that the land portion and the groove portion provided on the optical disk 1 form a continuous spiral, respectively, a rotary encoder 36 provided on the rotational axis of the optical disk 1 for detecting the starting positions of the one-track jumps at one location of the optical disk 1 by detecting one turn of the optical disk 1, and a switch 35 for switching the output signals from the mark detection circuit 34 and the rotary encoder 36. The land-groove switching circuit 33 includes a synchronization detection circuit 37 for detecting a synchronization signal in synchronization with the rotation of the optical disk 1 from the output signal of the mark detection circuit 34 or the rotary encoder 36, and a jump pulse generation circuit 38 for generating one-track jump pulse based on the synchronization signal.

The tracking servo circuit 12 includes a LPF and phase compensation circuit 27 for allowing effective servo by eliminating noise components from the tracking error signal from the tracking error detection circuit 26 and for compensating for phase lag that occurs before the target value is followed up, an adder 28 for adding the output of the LPF and phase compensation circuit 27 and the one-track jump pulse from the jump pulse generation circuit 38 of the land-groove switching circuit 33 and a tracking driver 29 for amplifying the output of the adder 28 to output a tracking servo signal.

Such a tracking servo system operates as follows. In this tracking servo system, the beams reflected by the optical disk 1 which have been split by the beam splitter 31 are detected on the two split light receiving surfaces A and B of the photodiode 21. The respective signals from the two split light receiving surfaces A and B of the photodiode 21 are supplied to the non-inverting input (+) and inverting input (−) of the differential amplifier circuit that forms a part of the tracking error detection circuit 26. The tracking error detection circuit 26 detects the differential signal A−B as a tracking error signal. The respective signals from the two split light receiving surfaces A and B of the photodiode 21 are also supplied to one input (+) and another input (+) of the adding circuit that forms a part of the RF amplifier circuit 24. The RF amplifier circuit 24 outputs the sum signal A+B as an RF reproduction signal.

In the land-groove switching circuit 33, the RF signal from the RF amplifier circuit 24 is supplied to the mark detection circuit 34. The mark detection circuit 34 detects the mark provided at one location on the optical disk 1 for detecting the starting positions of one-track jumps so that the land portion and the groove portion provided on the optical disk 1 form a continuous spiral, respectively. The rotary encoder 36 detects the starting positions of one-track jumps at one location of the optical disk 1 each time the optical disk 1 makes one turn by detecting a signal indicating one turn of the optical disk 1 from the rotation of the optical disk 1. The output signals of the mark detection circuit 34 and the rotary encoder 36 are respectively supplied to fixed contacts of the switch 35.

The setting signal S from the system control circuit 19 shown in FIG. 3 is supplied in advance to a movable contact of the switch 35 during initialization to allow the output signal from the mark detection circuit 34 or rotary encoder 36 to be selected and set based on the setting signal S. Such setting is determined by the fashions and specifications of the land and the groove on the optical disk 1. The output signal of the mark detection circuit 34 or the rotary encoder 36 selected based on the setting signal S is supplied from the movable contact of the switch 35 to the synchronization detection circuit 37. The land-groove switching circuit 33 detects the synchronization signal in synchronization with the rotation of the optical disk 1 from the output signal of the mark detection circuit 34 or rotary encoder 36. The synchronization signal is supplied to the jump pulse generation circuit 38. The jump pulse generation circuit 38 generates a one-track jump pulse based on the synchronization signal.

In the tracking servo circuit 12, the tracking error signal from the tracking error detection circuit 26 is supplied to the LPF and phase compensation circuit 28. The LPF and phase compensation circuit 28 allows effective servo by eliminating noise components from the tracking error signal and compensates for the phase lag that occurs before the target value is followed up. The output of the LPF and phase compensation circuit 27 is supplied to one input terminal (+) of the adder 28. Further, the one-track jump pulse from the jump pulse generation circuit 38 is supplied to the other input terminal (+) of the adder 28. The adder 28 adds the output of the LPF and phase compensation circuit 27 and the one-track jump pulse from the jump pulse generation circuit 38 of the land-groove switching circuit 33. The summed output of the adder 28 is supplied to the tracking driver 29. The tracking driver 29 amplifies the output of the adder 28 to a level that can drive the tracking coil 30 and outputs a tracking servo signal.

In the optical pick-up 2, the lens 32 is fine-adjusted by the tracking coil 30 in the direction of the tracks. When a predetermined one turn of the optical disk 1 is detected during reproduction, tracking servo is activated to achieve an on-track state with the target value for the tracking servo set to the position reached by a one-track jump, and a laser beam is formed by the lens 32 to reproduce a recording pit on the recording thin film of the optical disk 1. When a predetermined one turn of the optical disk 1 is detected during recording, tracking servo is activated to achieve an on-track state with the target value for the tracking servo set to the position reached by a one-track jump, and a laser beam is formed by the lens 32 to form a recording pit on the recording thin film of the optical disk 1.

Figures 5A, 5B:
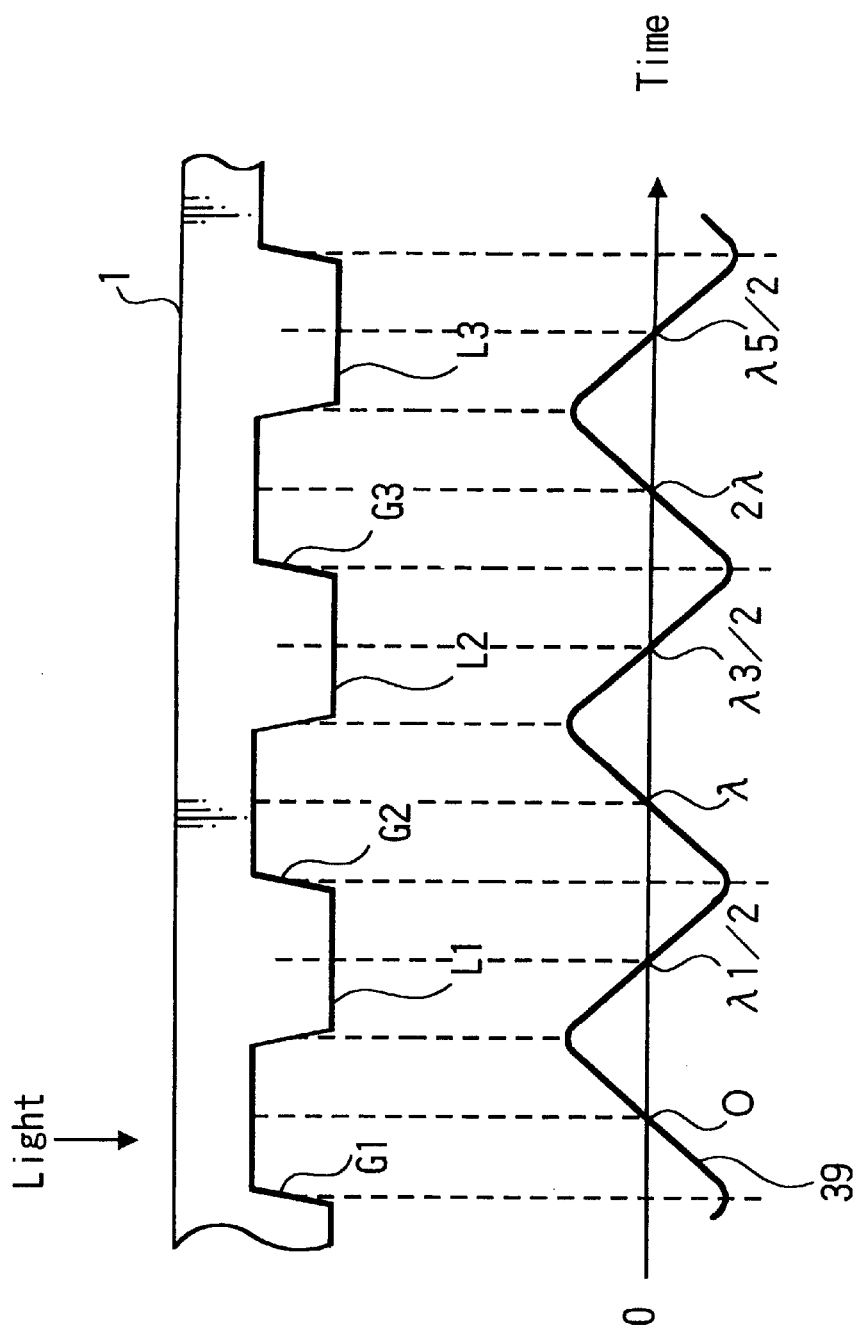

Such a method of tracking is referred to as "a push-pull method", and tracking servo using the push-pull method according to the embodiment will be described with reference to FIGS. 5A and 5B. Referring to FIG. 5A, in the case of a land-groove recording method wherein information data are recorded on groove portions G1, G2, G3 and also on regions referred to as land portions L1, L2, L3 between the groove portions G1, G2, G3, tracking must be performed on each of the groove portions G1, G2, G3 and the land portions L1, L2, L3 in order to record information data on both of the groove portions G1, G2, G3 and the land portions L1, L2, L3 which are adjacent to each other.

As described above, the push-pull method is a method wherein rays of light which have been reflected and diffracted by the groove portions G1, G2, G3 on the recording thin film of the optical disk 1 are obtained as differences between outputs from the two split light receiving surfaces of the photodiode 21 to detect a tracking error. Specifically, when the laser spot is matched with the centers of the grooves G1, G2, G3 or the regions between the grooves G1, G2, G3 and the groove portions G1, G2, G3 which are referred to as land portions L1, L2, L3, a track matching has occurred as a result of tracking and a tracking error signal 39 is obtained as a symmetric distribution of reflected and diffracted beams with respect to left and right as shown in FIG. 5B. Otherwise, the tracking has failed to result in an off-track state which appears as an S-shaped curve as a distribution of reflected and diffracted beams having different amplitudes and optical intensities which is shifted to the left and right.

In this example, when one predetermined turn of the optical disk 1 is detected during reproduction, the land-groove switching circuit 33 performs tracking to achieve an on-track state wherein the centers of the groove portions G1, G2, G3 and the land portions L1, L2, L3 are matched with the center of the laser spot with the target value for tracking servo set at a position reached by a one-track jump and makes setting such that the target value for tracking servo jumps by one track each time the disk makes one turn to activate tracking servo at each of points in time 0, $\lambda/2$, $\lambda$, $\lambda 3/2$, $2\lambda$, $\lambda 5/2$ for one wavelength $\lambda$ of the tracking signal.

When one predetermined turn of the optical disk 1 is detected during recording, tracking is performed to achieve an on-track state wherein the centers of the groove portions G1, G2, G3 and the land portions L1, L2, L3 are matched with the center of the laser spot with the target value for tracking servo set at a position reached by a one-track jump and setting is made such that the target value for tracking servo jumps by one track each time the disk makes one turn to activate tracking servo at each of points in time 0, $\lambda/2$, $\lambda$, $\lambda 3/2$, $2\lambda$, $\lambda 5/2$ for one wavelength $\lambda$ of the tracking signal.

By causing the target value for tracking servo to jump by one track to activate tracking servo at a position reached by a one-track jump each time the optical disk 1 makes one turn as described above, tracking can be performed such that the respective groove portions G1, G2, G3 and land portions L1, L2, L3 on the recording thin film of the optical disk 1 form a continuous spiral.

Figure 1:
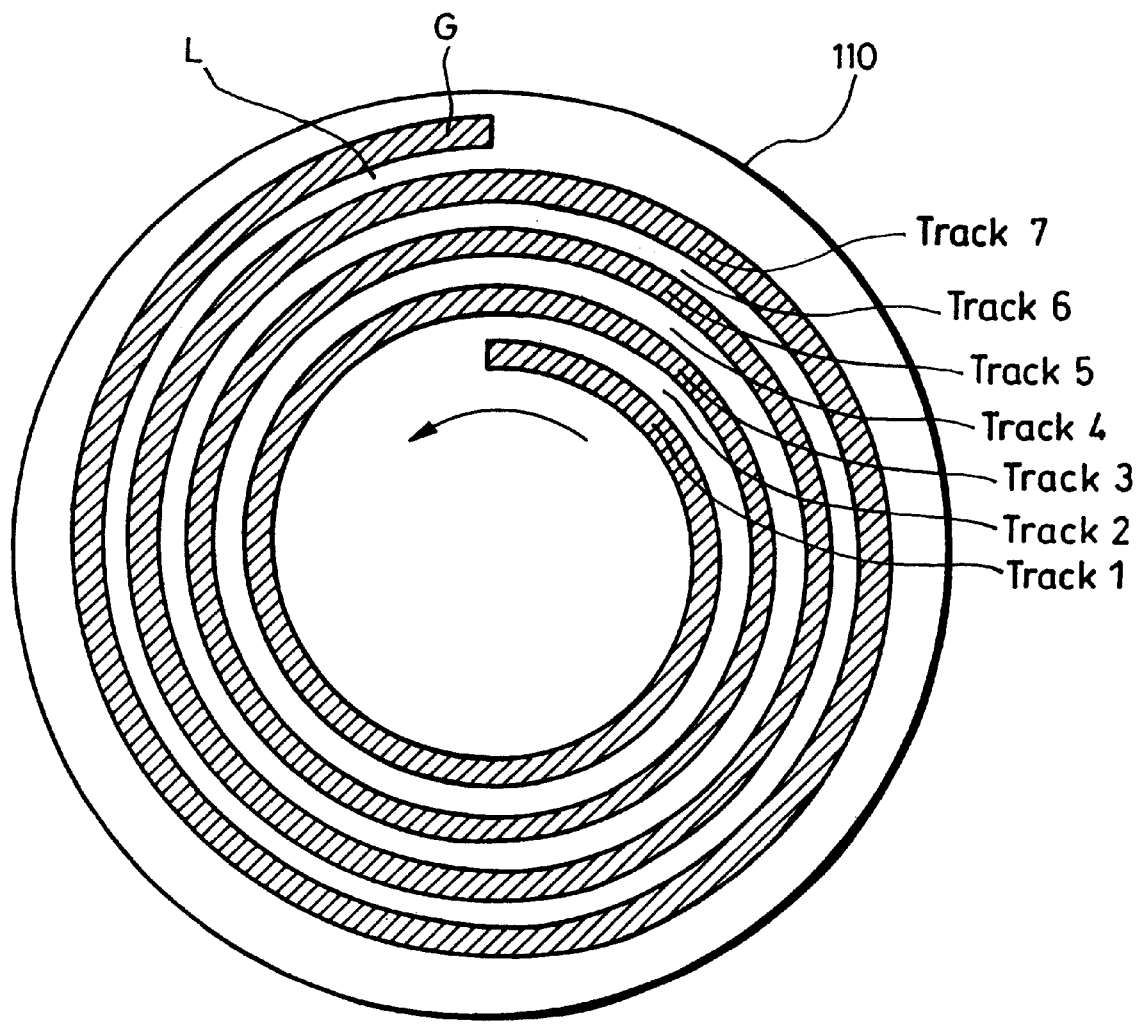
FIG. 1 is a diagram showing a double spiral groove on a conventional optical disk.
Figure 6:
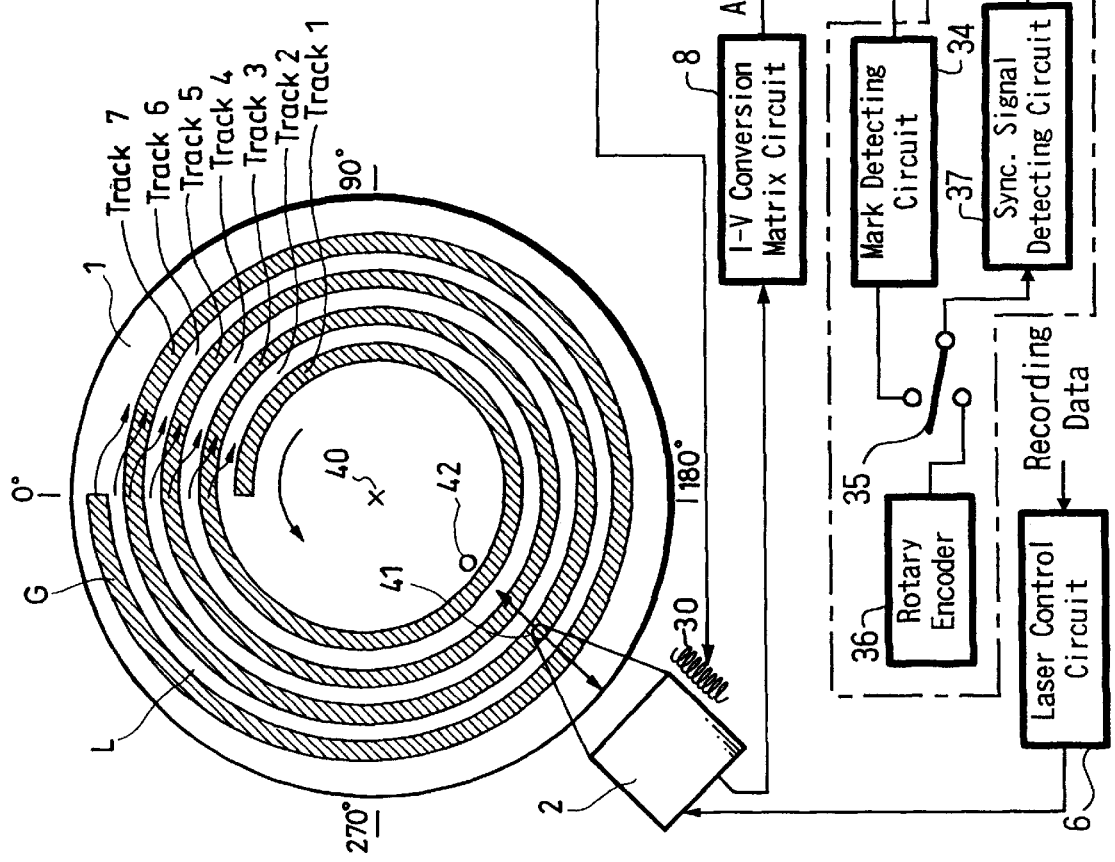
FIG. 6 is a diagram showing a configuration of main parts of a first optical disk and the first optical disk recording and reproducing apparatus according to the present invention.

The configurations of main parts of an optical disk and an optical disk recording and reproducing apparatus according to a first embodiment will be described with reference to FIG. 6. Referring to FIG. 6, an optical disk 1 is formed with a groove G that constitutes one spiral guide groove extending from the inner circumference to the outer circumference. A land L is formed between the grooves G. The optical disk 1 shown in FIG. 6 corresponds to the double spiral groove shown in FIG. 1, and a land-groove recording method being performed by using such an optical disk 1 will be described below. In the embodiment, switching from a groove to a land is easily achieved by means of tracking control with the manufacture of the disk itself simplified by the use of a conventional double spiral optical disk. Such embodiment makes it possible to perform an operation as a single spiral basis on a double spiral optical disk which is easier to manufacture to maintain continuity of sequential tracks and to allow an optical recording and reproducing operation which can be applied to video recording and reproduction which must be performed continuously.

To record and reproduce a record mark on the groove G and the land L of such an optical disk 1, a track 1 is first recorded and reproduced for the groove G from the inner circumference of the optical disk. Subsequently, when one turn of the optical disk 1 is detected, a one-track jump is performed toward the inner circumference to record and reproduce a track 2 for the land L. When the next one turn of the optical disk 1 is detected, a one-track jump is performed toward the inner circumference to record and reproduce a track 3 for the groove G. When the next one turn of the optical disk 1 is detected, a one-track jump is performed toward the inner circumference to record and reproduce a track 4 for the land L. When the next one turn of the optical disk 1 is detected, a one-track jump is performed toward the inner circumference to record and reproduce a track 5 for the groove G. When the next one turn of the optical disk 1 is detected, a one-track jump is performed toward the inner circumference to record and reproduce a track 6 for the land L. When the next one turn of the optical disk 1 is detected, a one-track jump is performed toward the inner circumference to record and reproduce a track 7 for the groove G. When the next one turn of the optical disk 1 is detected, a one-track jump is performed toward the inner circumference and so on. Records or addresses are thus provided up to the outer circumference to complete recording and reproduction.

As shown in FIG. 6, the main part of this optical disk recording and reproducing apparatus includes the optical pickup 2, the laser control circuit 6, the I–V conversion matrix 8, the tracking servo circuit 12, the tracking coil 30, the land-groove switching circuit 33, and the ECC decode circuit 18.

The land-groove switching circuit 33 includes the mark detection circuit 34 for detecting the mark provided in one location on the optical disk 1 for detecting the starting position of one-track jumps so that the land portion and the groove portion provided on the optical disk 1 form respective continuous spirals from the RF signal supplied by the RF amplifier circuit 24, the rotary encoder 36 provided on the rotational axis of the optical disk 1 for detecting the starting position of one-track jumps at one location of the optical disk 1 by detecting one turn of the optical disk 1 and the switch 35 for switching the output signals from the mark detection circuit 34 and the rotary encoder 36. The land-groove switching circuit 33 includes the synchronization detection circuit 37 for detecting a synchronization signal in synchronization with the rotation of the optical disk 1 from the output signal of the mark detection circuit 34 or rotary encoder 36 and the jump pulse generation circuit 38 for generating one-track jump pulses based on the synchronization signal.

The tracking servo circuit 12 includes the LPF and phase compensation circuit 27 for allowing effective servo by eliminating noise components from the tracking error signal from the tracking error detection circuit 26 and for compensating for the phase lag that occurs before the target value is followed up, the adder 28 for adding the output of the LPF and phase compensation circuit 27 and the one-track jump pulses from the jump pulse generation circuit 38 of the land-groove switching circuit 33 and the tracking driver 29 for amplifying the output of the adder 28 to output the tracking servo signal.

The parts in FIG. 6 that correspond to parts in FIGS. 3 and 4 are identical to the latter and therefore will not be described here.

FIGS. 7A–7D shows a specific operation of the land-groove method of recording and reproducing according to the embodiment carried out with the configuration as described above. This embodiment is used in sequential recording and reproduction wherein video data is continuously recorded on and reproduced from a disk. Obviously, it may be of course applied to random recording and reproduction of a set of data on a disk as long as the set of data is continuously recorded and reproduced with a certain track width.

The optical disk 1 is driven by the spindle motor 3 for rotation in the direction indicated by the arrow in FIG. 6 having a period of 33.3 ms at a rotational frequency of 30 Hz. The optical pick-up 2 can be moved by the sled motor 10 in the entire region in the radial direction. Optical beam spots 41 and 42 shown in FIG. 6 are tracked by the tracking coil 30 in the double spindle actuator in a microscopic range in the radial direction to be positioned on a track.

A recording operation is performed as follows. A track 0 is detected by a well-known means which is not shown to position the optical beam spot 42 at this position where it stands by. The optical beam spot 41 is positioned at the beginning of the track 1 as a result of the rotation of the optical disk 1 and, at the same time, the laser control circuit 6 starts the driving of recording to record desired data on the entire track 1.

When the recording on the track 1 is completed as a result of the rotation of the recording medium, i.e., when the point on the recording medium at the angular position thereof at 360 degrees passes directly under the beam spot 41, a home index pulse is generated by the rotary encoder 36 having a shaft that is coaxial with the axis of rotation 40 to produce a one-track jump pulse from the jump pulse generation circuit 38.

In the land-groove switching circuit 33, the mark detection circuit 34 detects a wobble mark to be described later provided at one location of the optical disk 1 for detecting the starting position of a one-track jump so that the land portion and the groove portion provided on the optical disk 1 form respective continuous spirals from the RF signal supplied by the RF amplifier circuit 24. The rotary encoder 36 is provided on the rotational axis of the optical disk 1 and detects the starting position of the one-track jump at one location of the optical disk 1 by detecting one turn of the optical disk 1. The switch 35 switches the output signals from the mark detection circuit 34 and the rotary encoder 36 and supplies it to the synchronization detection circuit 37. The synchronization detection circuit 37 detects a synchronization signal in synchronization with the rotation of the optical disk 1 from the output signal of the mark detection circuit 34 or rotary encoder 36 and supplies it to the jump pulse generation circuit 38. Thus, the jump pulse generation circuit 38 generates a one-track jump pulse based on the synchronization signal in synchronization with the rotation of the optical disk 1.

Figure 7A:
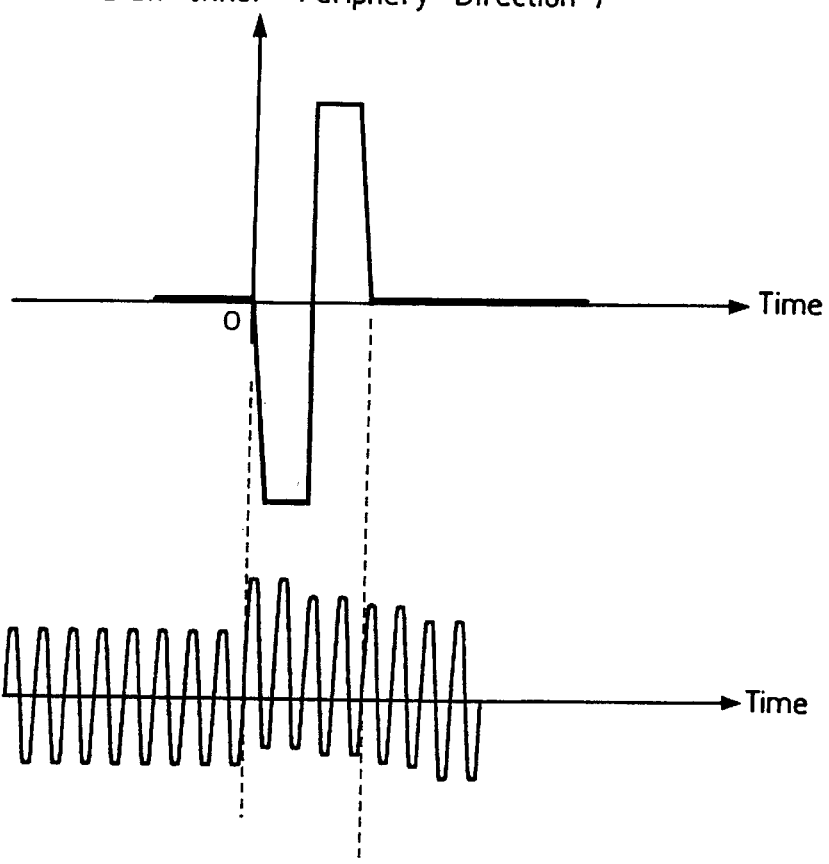

The one-track jump pulse is supplied to the other addition input terminal (+) of the adder 28 of the tracking servo circuit 12. A phase-compensated output signal which is obtained by performing phase compensation on the tracking signal by the LPF and phase compensation circuit 27 is supplied to one of the addition terminals (+) of the adder 28. The adder 28 outputs an output sum signal to allow tracking at the position reached by the one-track jump. The output sum signal of the adder 28 is supplied to the tracking driver 29. The tracking driver 29 supplies a driving current signal to the tracking coil 30. This driving current signal has a waveform as shown in FIG. 7A. Specifically, in FIG. 7A, a current is once supplied to apply a brake in a negative direction and, thereafter, a current is supplied to cause a one-track jump in a positive direction (the recording direction which is the direction toward the inner circumference of the disk here).

Figure 7B:
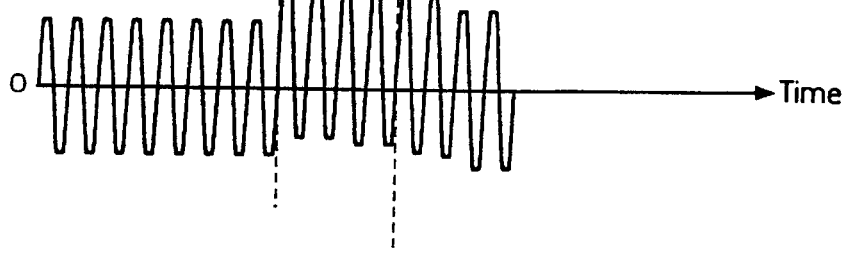

FIG. 7B shows the waveform of the data reproduced at this time. As shown in FIG. 7B, the waveform of the reproduction RF signal includes distortion in the period during which the current to cause a one-track jump as shown in FIG. 7A is supplied to the tracking coil. The reason is that distortion occurs due to a difference between the recording characteristics of the groove G and the land L that is encountered when data is recorded on the locus of track switching from the groove G to the land L or from the land L to the groove G. Therefore, as shown in FIG. 6, the reproduction RF signal is supplied to the ECC decode circuit 18 to correct the data error at the connection point where the switching occurs. Thus, a reproduction signal is obtained which has been corrected in the region where the data is lost. In this case, a Reed-Solomon code decoding circuit is used as the ECC decode circuit 18.

Figure 7C:
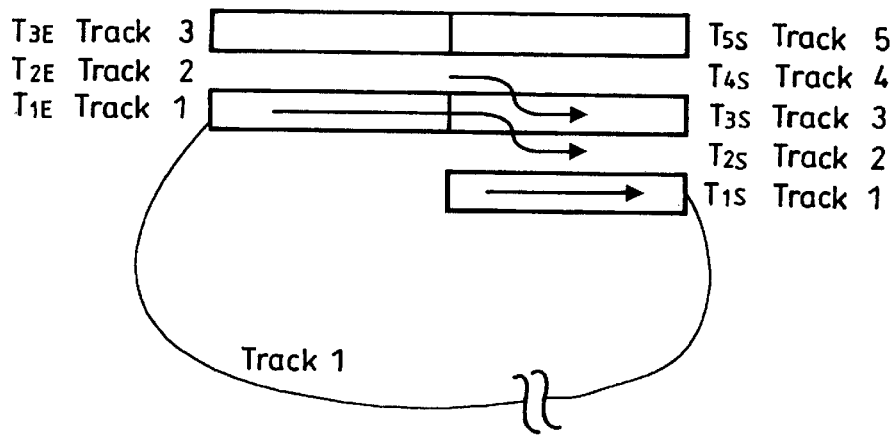

The locus of tracks at this time is illustrated in FIG. 7C. First, the track 1 is sequentially recorded and reproduced from a leading end $T_{1S}$ up to a terminating end $T_{1E}$ thereof of a groove G from the inner circumference of the optical disk. Subsequently, when one turn of the optical disk 1 is detected by the mark detection circuit 34, a one-track jump toward the inner circumference is caused by a one-track jump pulse from the jump pulse generation circuit 38 to record and reproduce the track 2 from the leading end $T_{2S}$ up to the terminating end $T_{2E}$ thereof for a land L. Subsequently, when another turn of the optical disk 1 is detected by the mark detection circuit 34, a one-track jump toward the inner circumference is caused by a one-track jump pulse from the jump pulse generation circuit 38 to record and reproduce the track 3 from the leading end $T_{3S}$ up to the terminating end $T_{3E}$ thereof for a groove G. Then, when one turn of the optical disk 1 is detected by the mark detection circuit 34, a one-track jump toward the inner circumference is caused by a one-track jump pulse from the jump pulse generation circuit 38 to record and reproduce the track 4 from the leading end $T_{4S}$ up to the terminating end $T_{4E}$ thereof for a land L. Subsequently, when another turn of the optical disk 1 is detected by the mark detection circuit 34, a one-track jump toward the inner circumference is caused by a one-track jump pulse from the jump pulse generation circuit 38 to record and reproduce the track 5 for a groove G. Thus, the locus of tracks shown in FIG. 7C is obtained.

Figure 7D:
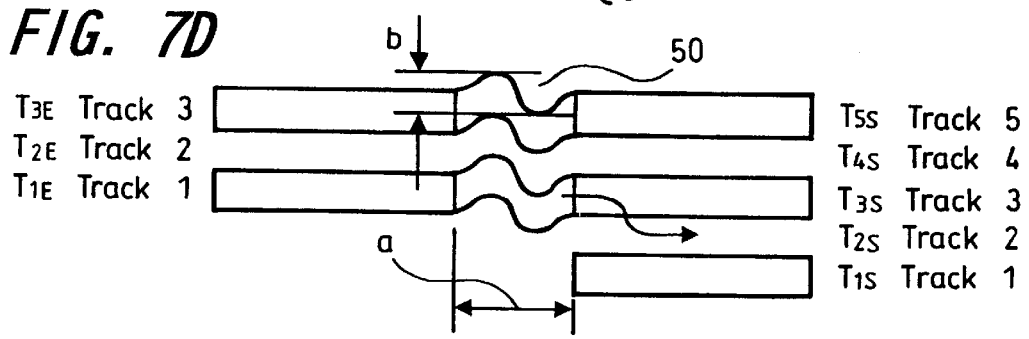
FIG. 7D shows a wobble mark.

Further, as shown in FIG. 7D, a wobble mark 50 having a mark length a and a fluctuating width b may be provided between the terminating end $T_{1E}$ of the track 1 and the leading end $T_{3S}$ of the track 3 of a groove G and between the terminating end $T_{3E}$ of the track 3 and the leading end $T_{5S}$ of the track 5 of a groove G and so on to allow precise notification of the position of the one-track jumps on the optical disk 1 to the jump pulse generation circuit 38 by detecting the wobble marks 50 by the mark detection circuit 34. In this case, the wobble marks 50 do not affect the data recorded and only function to cause the land-groove switching circuit 33 to effect one-track jumps.

Figure 8:
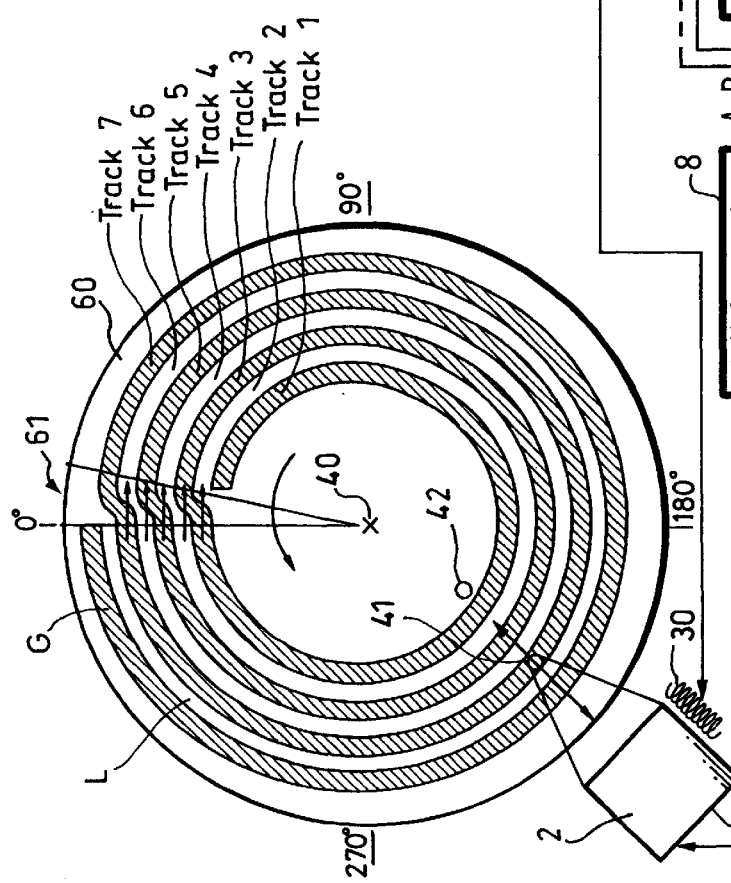
FIG. 8 is a diagram showing configurations of major parts of a second optical disk and a second optical disk recording and reproducing apparatus according to the present invention.
Figure 8:
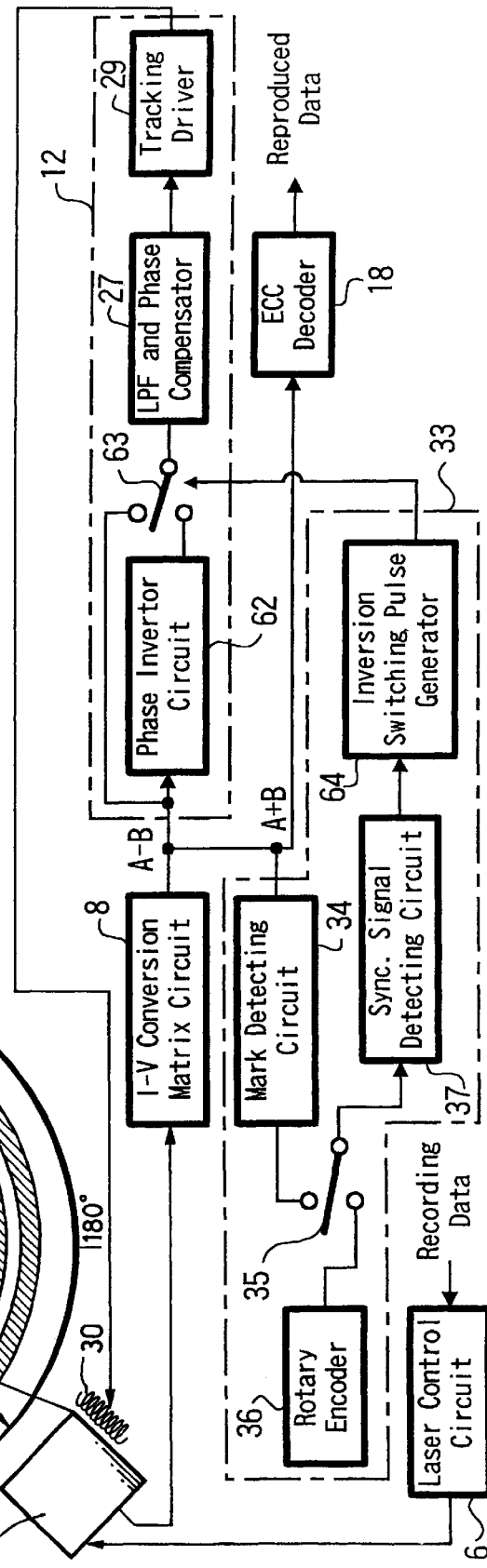

An optical disk and an optical disk recording and reproducing apparatus according to a second embodiment will now be described with reference to FIG. 8. In FIG. 8, like parts and circuits corresponding to those shown in FIG. 6 are marked with the same reference numbers and need not be described later on. An optical disk 60 includes spiral grooves G which extend from the inner circumference toward the outer circumference and each of which corresponds to one turn and a transition region 61 at one location on the circumference of the optical disk 60 that are formed such that the grooves G form a single guide groove. Lands L are formed in between the adjacent grooves G. The optical disk 1 shown in FIG. 8 corresponds to a disk obtained by providing the transition regions 61 on the single spiral groove shown in FIG. 2, and land-groove recording utilizing such optical disk 60 will be described below.

In the case of the optical disk and the optical disk recording and reproducing apparatus according to the mode of carrying out the invention shown in FIGS. 6 and 7, the switching between the land and the groove during tracking is achieved by causing a one-track jump of the optical pickup 2 to occur once each time the optical disk 1 makes one turn. However, there is a possibility that it becomes difficult to obtained a well aligned locus of tracks when variation in the characteristics of the optical pick-up 2 is considered.

In order to solve this problem, in another embodiment, the optical disk 60 is used which includes grooves in a configuration such that they are smoothly shifted in one direction by an amount corresponding to the pitch of one track at the region where one turn of the optical disk terminates. Although the transition region 61 at the terminating region is shown in FIG. 8 to be angled at about 10 degrees in the tangential direction of the groove for easier understanding, the angle can be reduced to $\frac{1}{100}$ in actual mastering.

Figure 2:
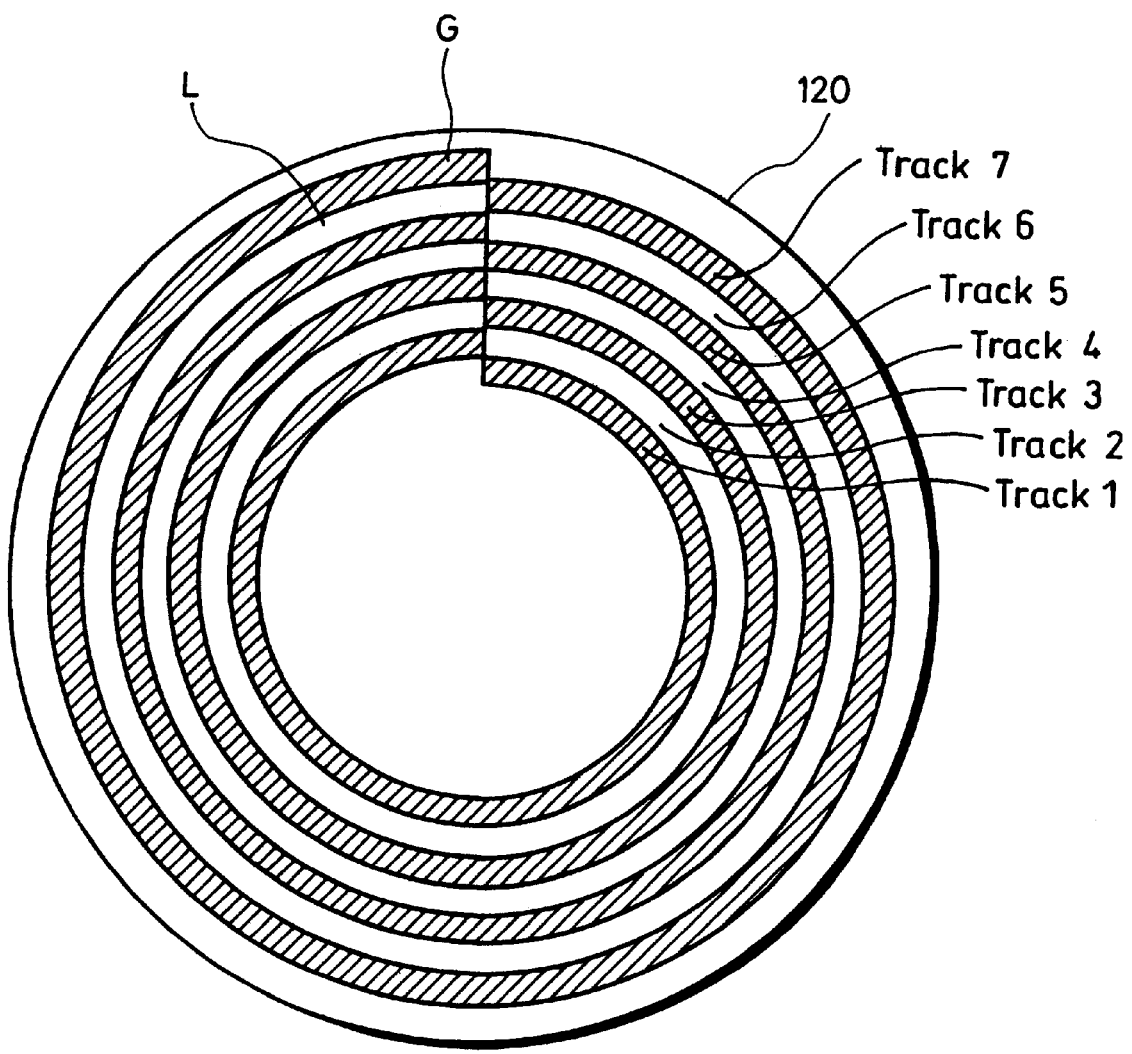
FIG. 2 is a diagram showing single spiral grooves on a conventional optical disk.

In another embodiment, there is no need for performing a one-track jump when tracking is continued from the track 1 to the track 2, from the track 2 to the track 3 and so on as in the above-described embodiment, and the operation performed on the single spiral groove as shown in FIG. 2 will be sufficient. However, it is necessary to invert the phase of the tracking error signal to switch from a groove G to a land L or from a land L to a groove G during continuous tracking from the track 1 to the track 2, from the track 2 to the track 3 and so on. Details thereof will be now described.

Specifically, to perform recording or reproduction of a recording mark on the groove G and the land L of such an optical disk 60, a track 1 on the groove G is first recorded and reproduced sequentially from the inner circumference of the optical disk. Subsequently, the phase of the tracking error signal is reversed when one turn of the optical disk 60 is detected to record and reproduce a track 2 of the land L. Subsequently, the phase of the tracking error signal is reversed in the forward direction when one turn of the optical disk 60 is detected to record and reproduce a track 3 of the groove G. Subsequently, the phase of the tracking error signal is reversed when one turn of the optical disk 60 is detected to record and reproduce a track 4 of the land L. Subsequently, the phase of the tracking error signal is reversed in the forward direction when one turn of the optical disk 60 is detected to record and reproduce a track 5 of the groove G. Subsequently, the phase of the tracking error signal is reversed when one turn of the optical disk 60 is detected to record and reproduce a track 6 of the land L. Subsequently, the phase of the tracking error signal is reversed in the forward direction when one turn of the optical disk 60 is detected to record and reproduce a track 7 of the groove G. Subsequently, when one turn of the optical disk 60 is detected, the phase of the tracking error signal is reversed and so on. Records or addresses are thus provided up to the outer circumference to complete recording and reproduction.

As shown in FIG. 8, the major part of this optical disk recording and reproducing apparatus includes an optical pickup 2, a laser control circuit 6, an I–V conversion matrix 8, a tracking servo circuit 12, a tracking coil 30, a land-groove switching circuit 33 and an ECC decode circuit 18.

The land-groove switching circuit 33 includes a mark detection circuit 34 for detecting a mark for the transition region 61 provided at one location on the optical disk 60 for detecting the position where the phase of the tracking error signal is to be reversed so that the land portion and groove portion provided on the optical disk 60 form respective continuous spirals from an RF signal supplied by an RF amplifier circuit 24, a rotary encoder 36 provided on the rotational axis of the optical disk 60 for detecting the position at one location of the optical disk 60 where the phase of the tracking error signal is to be reversed by detecting one turn of the optical disk 60 and a switch 35 for switching the output signals from the mark detection circuit 34 and the rotary encoder 36. The land-groove switching circuit 33 includes a synchronization detection circuit 37 for detecting a synchronization signal in synchronization with the rotation of the optical disk 60 from the output signal of the mark detection circuit 34 or the rotary encoder 36 and a reversing switching pulse generation circuit 64 for reversing the phase of the tracking error signal based on the synchronization signal.

The tracking servo circuit 12 includes a phase reversal circuit 62 for reversing the phase of the tracking error signal from the tracking error detection circuit 26, a switch 63 for switching the tracking error signal and a phase-reversed tracking error signal and outputting the same based on a switching pulse from the reversing pulse generation circuit 64, an LPF and phase compensation circuit 27 for allowing effective servo by eliminating noise components from the output signal of the switch 63 and for compensating for the phase lag that occurs before the target value is followed up and a tracking driver 29 for amplifying the output of the LPF and phase compensation circuit 27 to output a tracking servo signal.

The parts in FIG. 8 that correspond to parts shown in FIGS. 3 and 4 are identical to the latter and therefore will not be described here.

Figure 9A:
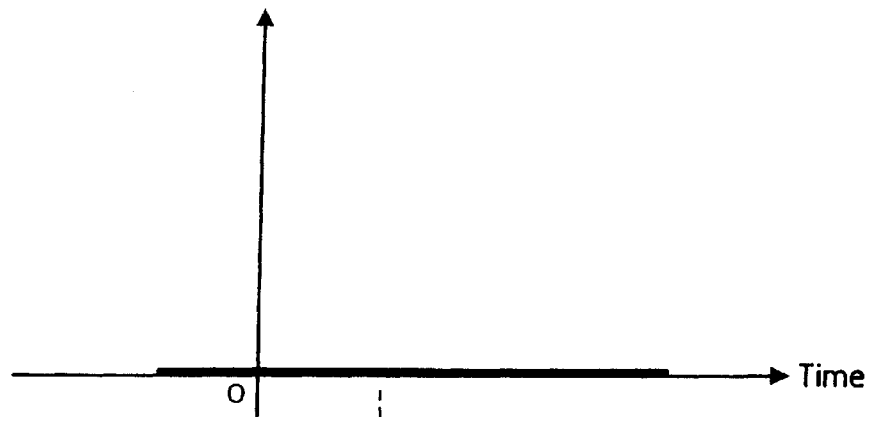
Figure 9B:
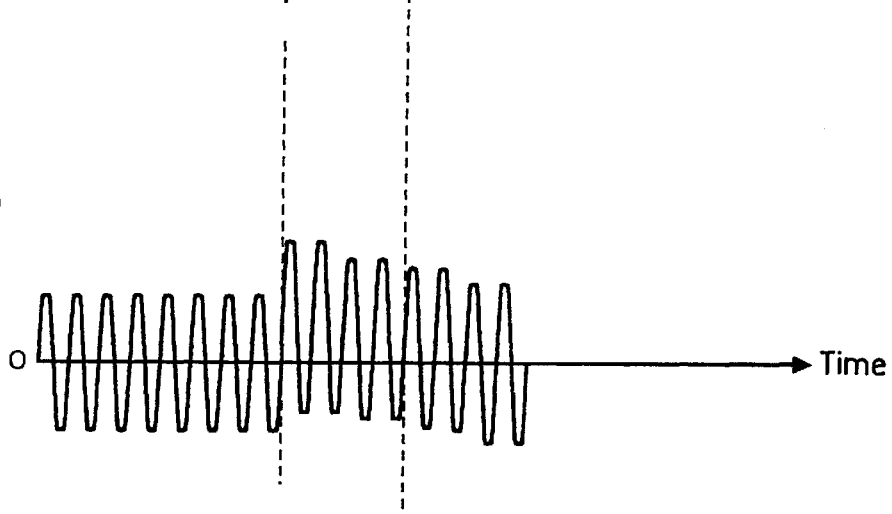
Figure 9C:
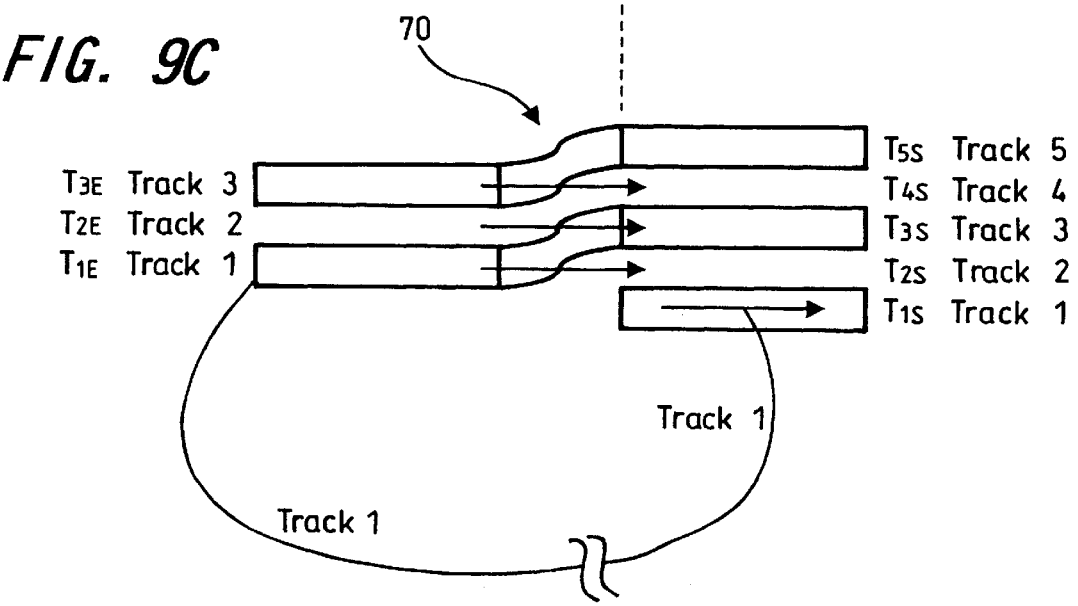

FIGS. 9A–9C shows a specific operation of the land-groove recording and reproducing according to the second embodiment carried out with the configuration as described above. This embodiment is used in sequential recording and reproduction wherein video data is continuously recorded on and reproduced from a disk. Obviously, it may be applied to random recording and reproduction of a set of data on a disk as long as the set of data is continuously recorded and reproduced with a certain track width.

The optical disk 60 is driven by a spindle motor 3 for rotation in the direction indicated by the arrow in FIG. 8 having a period of 33.3 ms at a rotational frequency of 30 Hz. The optical pick-up 2 can be moved by the sled motor 10 in the entire region in the radial direction. Optical beam spots 41 and 42 shown in FIG. 8 are tracked by the tracking coil 30 in the double spindle actuator in a microscopic range in the radial direction to be positioned on a track.

A recording operation is performed as follows. A track 0 is detected by a well-known means which is not shown to position the optical beam spot 42 at this position where it stands by. The optical beam spot 41 is positioned at the beginning of a track 1 as a result of the rotation of the optical disk 60 and, at the same time, the laser control circuit 6 starts the driving of recording to record desired data on the entire track 1.

When the recording on the track 1 is completed as a result of.the rotation of the optical disk 60, i.e., when the point on the recording medium at the angular position thereof at 360 degrees passes directly under the beam spot 41, a home index pulse is generated by the rotary encoder 36 having a shaft that is coaxial with an axis of rotation 40 to produce a phase reversing pulse for the tracking error signal from the reversing pulse generation circuit 64.

In the land-groove switching circuit 33, the mark detection circuit 34 detects the transition region 61 to be described later provided at one location on the optical disk 1 for detecting the position where the phase of the tracking error signal is to be reversed so that the land portion and the groove portion provided on the optical disk 60 form respective continuous spirals from the RF signal supplied by the RF amplifier circuit 24. The rotary encoder 36 is provided on the rotational axis of the optical disk 60 and detects the position at one location on the optical disk 60 where the phase of the tracking error signal is to be reversed by detecting one turn of the optical disk 60. The switch 35 switches the output signals from the mark detection circuit 34 and the rotary encoder 36 and supplies it to the synchronization detection circuit 37. The synchronization detection circuit 37 detects a synchronization signal in synchronization with the rotation of the optical disk 60 from the output signal of the mark detection circuit 34 or rotary encoder 36 and supplies it to the reversing pulse generation circuit 64. Thus, the reversing switching pulse generation circuit 64 generates the phase reversing switching pulse for-the tracking error signal based on the synchronization signal in synchronization with the rotation of the optical disk 60.

The phase reversing switching pulses for the tracking error signal are supplied to a movable contact of the switch 63 of the tracking servo circuit 12. The tracking error signal is supplied to one fixed contact of the switch 63 and the phase-reversed tracking error signal which has been subjected to phase-reversal at the phase reversal circuit 62 to the other fixed contact of the switch 63.

A non-inversion tracking error signal is output by the switch 63 based on the phase reversing switching pulse for the tracking error signal to perform tracking on tracks 1, 3, 5, and 7 on the grooves, and an inversion tracking error signal is output based on the phase reversing switching pulse for the tracking error signal to perform tracking on tracks 2, 4, and 6 and on the lands. The switch 63 supplies the non-inversion or inversion tracking error signal to the LPF and phase compensation circuit 27. The LPF and phase compensation circuit 27 outputs a phase-compensated output signal which is obtained by performing phase compensation on the non-inversion or inversion tracking error signal. The phase-compensated output signal from the LPF and phase compensation circuit 27 is supplied to the tracking driver 29. The tracking driver 29 supplies a driving current signal to the tracking coil 30. This driving current signal has a waveform as shown in FIG. 9A. Specifically, referring to FIG. 9A, a zero current which does not cause-any track jump is supplied to the tracking coil 30.

FIG. 9B shows the waveform of the data reproduced at this time. As shown in FIG. 9B, the waveform of the reproduction RF signal includes distortion in the period during which the zero current causing no track jump as shown in FIG. 9A is supplied to the tracking coil 30. The reason is that distortion occurs due to a difference between the recording characteristics of the groove G and the land L that is encountered when data is recorded on the locus of track switching from the groove G to the land L or from the land L to the groove G. Therefore, as shown in FIG. 8, the reproduction RF signal is supplied to the ECC decode circuit 18 to correct the data error at the connection point where the switching occurs. Thus, a reproduction RF signal is obtained which has been corrected in the region where the data is lost. In this case, a Reed-Solomon code decoding circuit is used as the ECC decode circuit 18.

The locus of tracks at this time is illustrated in FIG. 9C. First, the track 1 is recorded and reproduced from the leading end $T_{1S}$ up to the terminating end $T_{1E}$ thereof for a groove G sequentially from the inner circumference of the disk. Subsequently, when one turn of the optical disk 60 is detected, i.e., when a transition region 70 thereof is detected by the mark detection circuit 34, the phase of the tracking error signal is inverted by a tracking error phase reversing switching pulse from the reversing switching pulse generation circuit 64 to record and reproduce the track 2 from the leading end $T_{2S}$ up to the terminating end $T_{2E}$ thereof for a land L. Subsequently, when one turn of the optical disk 60 is detected, i.e., when the transition region 70 thereof is detected by the mark detection circuit 34, the phase of the tracking error signal switches direction due to a tracking error phase reversing switching pulse from the reversing switching pulse generation circuit 64 to record and reproduce the track 3 from the leading end $T_{3S}$ up to the terminating end $T_{3E}$ thereof for a groove G. Subsequently, when one turn of the optical disk 60 is detected, i.e., when the transition region 70 thereof is detected by the mark detection circuit 34, the phase of the tracking error signal is reversed by a tracking error phase reversing switching pulse from the reversing switching pulse generation circuit 64 to record and reproduce the track 4 from the leading end $T_{4S}$ up to the terminating end $T_{4E}$ thereof for a land L. Subsequently, when one turn of the optical disk 60 is detected, i.e., when the transition region 70 is detected by the mark detection circuit 34, the phase of the tracking error signal is reversed in the forward direction by a tracking error phase reversing switching pulse from the reversing switching pulse generation circuit 64 to record and reproduce the track 5 thereof for a groove G. Thus, the locus of tracks shown in FIG. 9C is obtained.

In this case, the transition regions 61 and 70 do not affect the data recorded and only function to cause the land-groove switching circuit 33 to effect the reversal of the tracking error signal.

Figure 10:
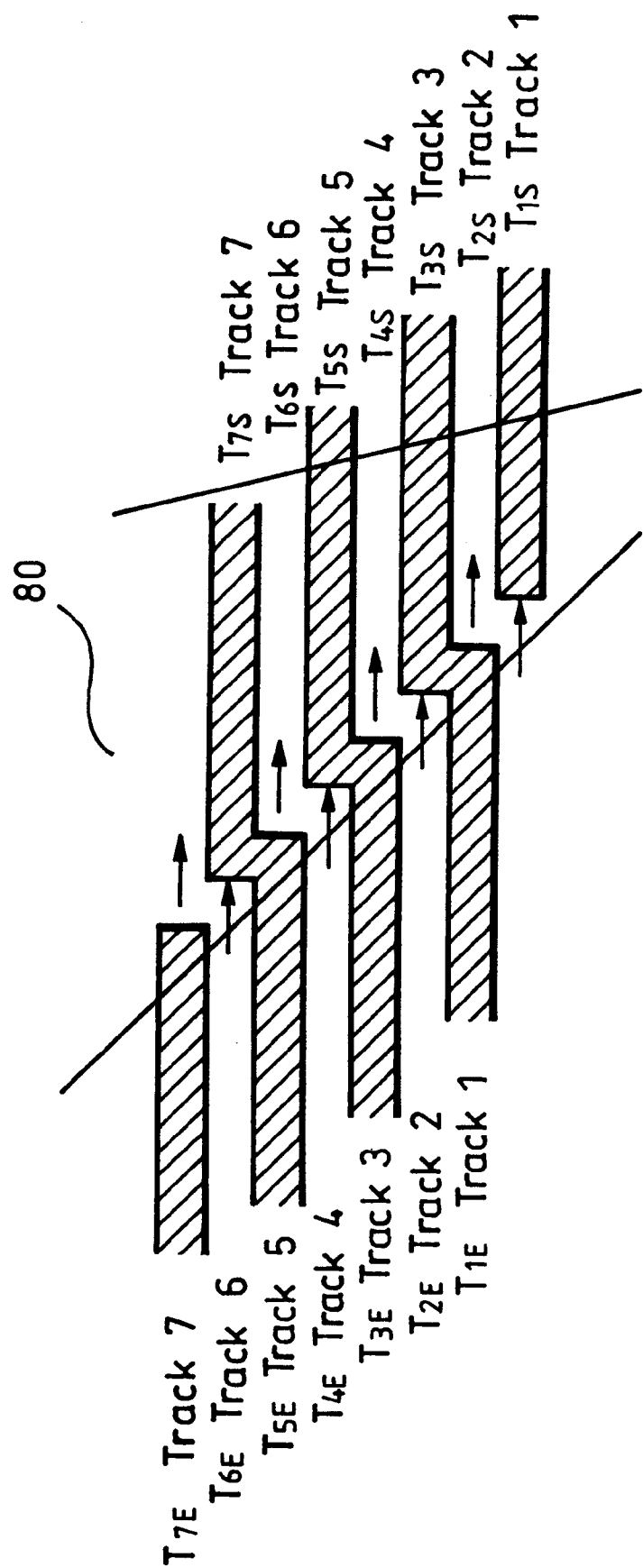
FIG. 10 is a diagram showing another example of transition regions on a third optical disk according to the present invention.

The transition regions may be formed as shown in an optical disk according to a third embodiment as shown in FIG. 10. Although the transition regions 61 in the mode of carrying out the invention shown in FIG. 8 are formed such that they are smoothly displaced toward tracks in one direction, the transition regions 80 shown in FIG. 10 are formed such that they are displaced at an angle of 90 degrees toward tracks in one direction. In this case, the transition regions 80 for connecting grooves G and lands L on the optical disk are formed such that they are sequentially shifted in the rotating direction toward the tracks in one direction.

A track 1 is sequentially recorded and reproduced from the inner circumference of the optical disk formed as described above from the leading end $T_{1S}$ up to the terminating end $T_{1E}$ thereof of a groove G. Subsequently, when one turn of the optical disk 60 is detected, i.e., when a transition region 80 is detected by the mark detection circuit 34, the phase of the tracking error signal is reversed by a tracking error phase reversing switching pulse from the reversing switching pulse generation circuit 64 to record and reproduce a track 2 from the leading end $T_{2S}$ up to the terminating end $T_{2E}$ thereof for a land L. Subsequently, when one turn of the optical disk 60 is detected, i.e., when a transition region 80 is detected by the mark detection circuit 34, the phase of the tracking error signal is returned by a tracking error phase reversing switching pulse from the reversing switching pulse generation circuit 64 to record and reproduce a track 3 of a groove G from the leading end $T_{3S}$ up to the terminating end $T_{3E}$ thereof. Subsequently, when one turn of the optical disk 60 is detected, i.e., when a transition region 80 is detected by the mark detection circuit 34, the phase of the tracking error signal is reversed by a tracking error phase reversing switching pulse from the reversing switching pulse generation circuit 64 to record and reproduce a track 4 of a land L from the leading end $T_{4S}$ up to the terminating end $T_{4E}$ thereof. Subsequently, when one turn of the optical disk 60 is detected, i.e., when a transition region 80 is detected by the mark detection circuit 34, the phase of the tracking error signal is returned by a tracking error phase reversing switching pulse from the reversing switching pulse generation circuit 64 to record and reproduce a track 5 of the groove G from the leading end $T_{5S}$ up to the terminating end $T_{5E}$ thereof. Subsequently, when one turn of the optical disk 60 is detected, i.e., when a transition region 80 is detected by the mark detection circuit 34, the phase of the tracking error signal is reversed by a tracking error phase reversing switching pulse from the reversing switching pulse generation circuit 64 to record and reproduce a track 6 of the land L from the leading end $T_{6S}$ up to the terminating end $T_{6E}$ thereof. Subsequently, when one turn of the optical disk 60 is detected, i.e., when a transition region 80 is detected by the mark detection circuit 34, the phase of the tracking error signal is returned by a tracking error phase reversing switching pulse from the reversing switching pulse generation circuit 64 to record and reproduce a track 7 of the groove G from the leading end $T_{7S}$ up to the terminating end $T_{7E}$ thereof. Thus, the locus of tracks shown in FIG. 10 is obtained. The configuration and operation are otherwise similar to those shown in FIGS. 8 and 9 and will therefore be not described here.

Further, although a third embodiment of the present invention has shown an example wherein the transition region is provided in the terminating position of a single spiral groove, instead of providing such transition region, a configuration as disclosed in the specification of the patent application titled "recording medium recording and reproducing apparatus and recording medium recording and reproducing method" (Japanese patent application No. 8-181777) previously filed by the same assignee as the present application may be employed, wherein a groove and a land are alternately formed for each track (for each turn) of a single spiral optical disk; tracking on a land or a groove therefore results in a track jump at the boundary between the land and the groove; the tracking error signal greatly fluctuates in positive and negative directions at this time at the boundary between the land and the groove to cause a track jump; the tracking signal at this time is used to generate a signal for the jump at the boundary between the land and the groove and thus stable tracking is performed on a disk having a land and a groove alternately and spirally formed by switching the tracking error signal at the boundary between the lands and the grooves.

Figure 11A:
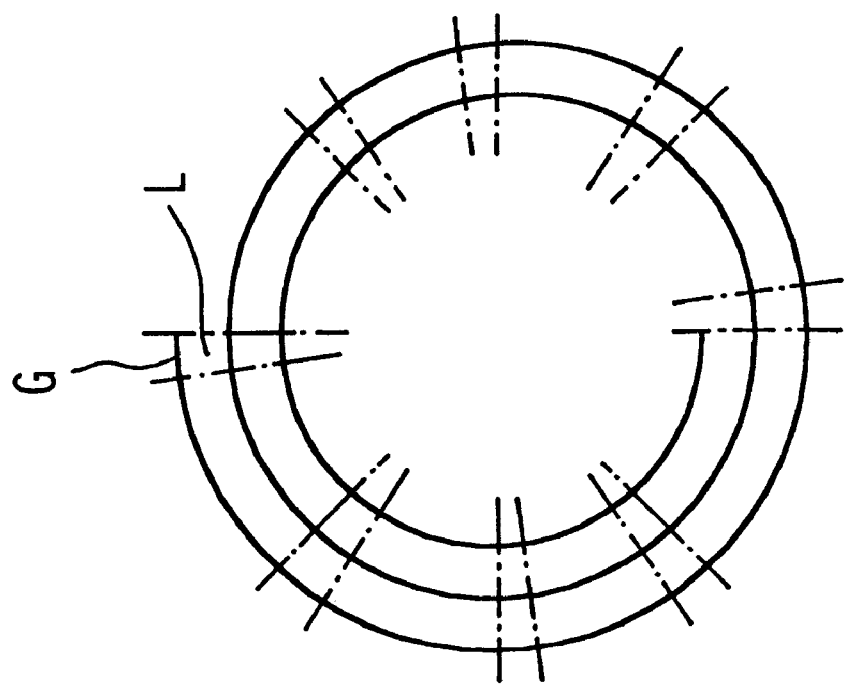
Figure 11B:
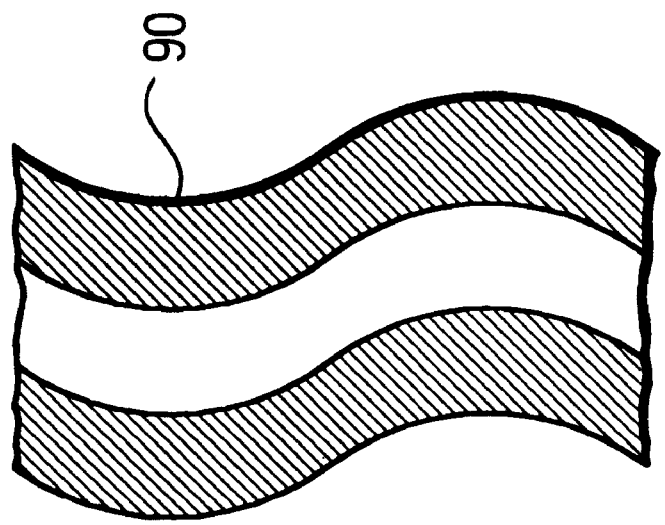

FIGS. 11A–11B shows the formation of double spiral grooves on an optical disk according to this embodiment. FIG. 11A shows double spiral grooves G which are indicated by solid lines in the form of a spiral. The grooves G are formed in advance on a recording thin film on the optical disk in the form of grooves such that they are directed to a transparent surface opposite to the recording thin film on the optical disk from the inner circumference to the outer circumference thereof at a predetermined track pitch. At this time, a land L is formed between the adjacent grooves G. FIG. 11B shows track position information 90 provided at eight locations on the circumference of the grooves G as indicated by the alternate long and short dashes line in FIG. 11A. The track position information 90 as address information is recorded by providing the grooves G such that they meander at a predetermined cycle to cause frequency modulation. In this case, the track position information 90 may be provided only on the side of tracks toward the inner circumference or toward the outer circumference. Alternatively, they may be provided on both of the sides of the tracks toward the inner and outer circumferences.

Figure 12B:
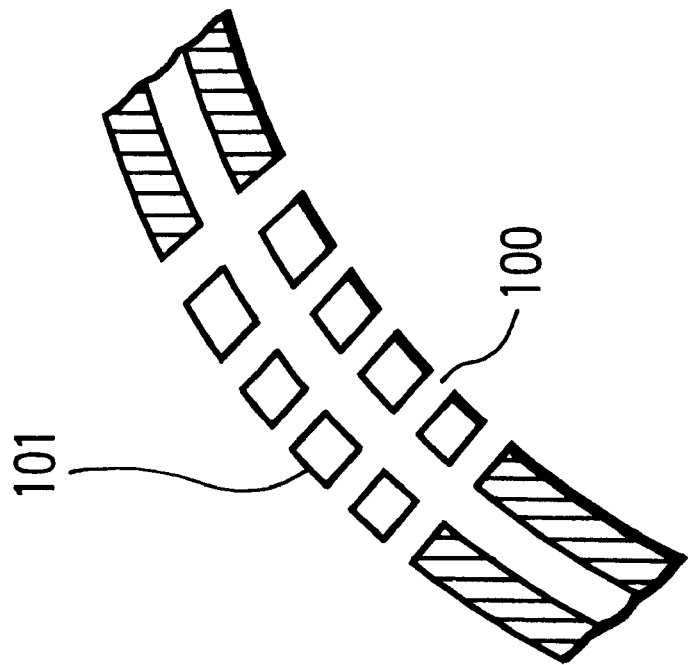
Figure 12A:
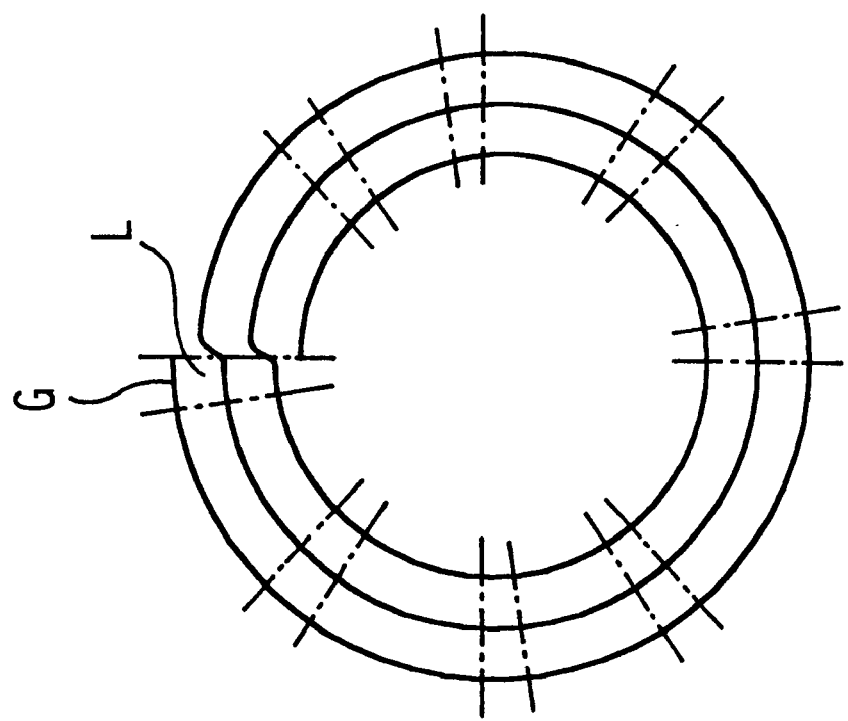

FIGS. 12A and 12B show the formation of a single spiral groove having a transition region provided thereon of an optical disk according to another embodiment. FIG. 12A shows a single spiral groove G having a transition region thereon, and the groove is indicated by the solid line in the form of a spiral and has a transition region at the ends thereof. The groove G and the land L are formed to be continuous in advance on a recording thin film of the optical disk in the form of a groove such that it is directed to a transparent surface opposite to the recording thin film of the optical disk from the inner circumference to the outer circumference thereof at a predetermined track pitch. At this time, the land L is formed such that it is continuous with the grooves G, and the grooves G are formed to be continuous with the lands L and have the transition regions on the ends thereof. The grooves G and the lands L are alternately sequentially formed toward the outer circumference of the disk at the transition region inside the circle and at the ends. Separated regions are provided in eight locations on the circumference of the grooves G as indicated by the alternate long and short dashed lines for each of predetermined sectors. As previously shown in FIG. 12B, address information may be provided by modulating the grooves. Alternatively, it may be provided as shown in FIG. 12B. FIG. 12B shows track position information 100 provided in the separated region on the groove G as shown in FIG. 12A. A recording mark 101 is provided in each of the predetermined sectors to record the track position information 100 as address information for each sector.

Each of the optical discs described above is a CAV (Constant Angular Velocity) disk and has a constant fundamental frequency of wobbling.

Although the above-described preferred and alternative modes for carrying out the invention have shown the example wherein the above-described mark detection circuit 34 detects a mark such as a wobble or the like provided at one location of one turn of double spiral grooves or detects transition regions provided in one location at the ends of single spiral grooves, instead of providing the mark at one location as described above, a configuration as disclosed in "optical disk, optical disk recording and reproducing apparatus and method, and optical disk forming apparatus and method" (Japanese patent application No. 7-275986) previously filed by the same assignee as the present invention may be employed wherein a mark is distributed on the circumference of a disk in a wobbling manner; a mark detection circuit detects components in an RF signal reproduced and output by an optical head that correspond to a clock synchronization mark; the periodicity of a detection pulse output by the mark detection circuit upon detection of the clock synchronization marks is determined by a mark periodicity detection circuit to discriminate the groove from the land; and thus stable tracking is performed by switching a tracking error signal at each turn of the disk.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical reproducing apparatus, comprising:

a recording medium having a recording track and a plurality of record marks, said track including a groove portion forming a continuous spiral having a plurality of turns on a recording surface and a land portion located between adjacent segments of said groove portion, information being recorded on each of said groove portion and said land portion on said recording medium, at least one record mark being recorded at each turn of each of said groove portion and said land portion;

an optical pickup for irradiating a light beam on said recording medium and reproducing said information recorded on said each of said groove portion and said land portion;

means for detecting said record mark; and means for alternately switching said irradiating means between said groove portion and said land portion each turn in response to detection of said at least one record mark.

2. An optical reproducing apparatus according to claim 1, further comprising:

means for outputting a synchronization signal synchronized with rotation of said recording medium; and changeover means for effecting a track jump at a predetermined position on said recording medium based on said synchronization signal.

3. An optical reproducing apparatus according to claim 1, further comprising:

changeover means for effecting a track jump at a specific position on said recording medium.

4. An optical reproducing apparatus according to claim 2, wherein said changeover means effects the track jump in response to a detection output from said mark detecting means.

5. An optical reproducing apparatus according to claim 1, wherein said record mark comprises a wobbled portion wherein said groove portion and said land portion on said recording medium are wobbled at a predetermined position on said recording medium.

6. An optical reproducing apparatus according to claim 1, wherein said record mark comprises a smoothly displaced portion wherein said groove portion and said land portion on said recording medium are smoothly displaced at a predetermined position on said recording medium.

7. A recording medium, comprising:

a recording track including a groove portion forming a continuous spiral having a plurality of turns on a recording surface and a land portion located between adjacent segments of said groove portion; and a record mark recorded at each turn along each of said groove portion and said land portion, wherein information is recorded on each of said land portion and said groove portion by positioning an optical pickup to irradiate a light beam at a target track position, and wherein switching between said groove portion and said land portion occurs each turn when said record mark is irradiated.

8. A recording medium according to claim 7, comprising:

a portion at a predetermined position where a track jump operation is carried out on said recording medium in synchronization with rotation of said recording medium.

9. A recording medium according to claim 7, comprising:

a portion at a predetermined position where a track jump operation is carried out.

10. A recording medium according to claim 7, wherein said record mark is a wobble mark having predetermined length and amplitude.

11. A recording medium according to claim 7, wherein said record mark comprises a wobbled portion wherein said groove portion and said land portion on said recording medium are wobbled at a predetermined position on said recording medium.

12. A recording medium according to claim 7, wherein said record mark comprises a portion where said groove portion and said land portion on said recording medium are smoothly displaced at a predetermined position on said recording medium.

13. A tracking method used for one of recording on and reproducing from a recording medium having a recording track and a plurality of record marks, said track including a groove portion forming a continuous spiral having a plurality of turns on a recording surface and a land portion located between adjacent segments of said groove portion, at least one record mark being recorded at each turn of each of said groove portion and said land portion, comprising the steps of:

detecting said at least one record mark formed at each turn on each of said groove portion and said land portion;

switching recording or reproduction from one of said land portion and said groove portion in response to detecting said at least one record mark at each turn by jumping from the continuous spiral of said one of said land portion and said groove portion to the continuous spiral of the other one of said land portion and said groove portion; and carrying out tracking by alternately irradiating said light beam on said groove portion and said land portion.

14. An optical recording/reproduction method, comprising the steps of:

irradiating a light beam on a recording medium having a recording track and a plurality of record marks, said track including a groove portion forming a continuous spiral having a plurality of turns on a recording surface and a land portion located between adjacent segments of said groove portion, at least one record mark being recorded at each turn;

recording/reproducing information on/from each of a groove portion and a land portion;

detecting said at least one record mark at each turn; and switching between said groove portion and said land portion, alternately at each turn, in response to detecting said at least one record mark.

15. An optical recording/reproduction method according to claim 14, further comprising the steps of:

outputting a synchronization signal synchronized with rotation of said recording medium; and effecting a track jump at a predetermined position on said recording medium based on said synchronization signal.

16. An optical recording/reproduction method according to claim 14, further comprising:

effecting a track jump at a specific position on said recording medium.

17. An optical recording/reproduction method according to claim 15, wherein said effecting step includes the step of effecting the track jump in response to a detection output from said mark detecting means.

18. An optical recording/reproduction method according to claim 14, wherein said record mark comprises a wobbled portion wherein said groove portion and said land portion on said recording medium are wobbled at a predetermined position on said recording medium.

19. An optical recording/reproduction method according to claim 14, wherein said record mark comprises a smoothly displaced portion wherein said groove portion and said land portion on said recording medium are smoothly displaced at a predetermined position on said recording medium.

20. An optical reproducing apparatus, comprising:
 a recording medium having a recording track and a wobbled record mark, said track including a groove portion forming a continuous spiral having a plurality of turns on a recording surface and a land portion located between adjacent segments of said groove portion, information being recorded on each of said groove portion and said land portion on said recording medium;
 an optical pickup for irradiating a light beam on said recording medium and reproducing said information recorded on said each of said groove portion and said land portion;
 means for detecting said record mark; and
 means for alternately switching said irradiating means between said groove portion and said land portion in response to detection of said record mark.

21. An optical reproducing apparatus according to claim 20, further comprising:
 means for outputting a synchronization signal synchronized with rotation of said recording medium; and
 changeover means for effecting a track jump at a predetermined position on said recording medium based on said synchronization signal.

22. An optical reproducing apparatus according to claim 20, further comprising:
 changeover means for effecting a track jump at a specific position on said recording medium.

23. An optical reproducing apparatus according to claim 21, wherein said changeover means effects the track jump in response to a detection output from said mark detecting means.

24. An optical reproducing apparatus according to claim 20, wherein said record mark comprises a wobbled portion wherein said groove portion and said land portion on said recording medium are wobbled at a predetermined position on said recording medium.

25. An optical reproducing apparatus according to claim 20, wherein said record mark comprises a smoothly displaced portion wherein said groove portion and said land portion on said recording medium are smoothly displaced at a predetermined position on said recording medium.

26. A recording medium, comprising:
 a recording track including a groove portion forming a continuous spiral having a plurality of turns on a recording surface and a land portion located between adjacent segments of said groove portion; and
 a wobbled record mark, wherein information is recorded on each of said land portion and said groove portion by positioning an optical pickup to irradiate a light beam at a target track position, and wherein switching between said groove portion and said land portion occurs when said record mark is irradiated.

27. A recording medium according to claim 26, comprising:
 a portion at a predetermined position where a track jump operation is carried out on said recording medium in synchronization with rotation of said recording medium.

28. A recording medium according to claim 26, comprising:
 a portion at a predetermined position where a track jump operation is carried out.

29. A recording medium according to claim 26, wherein said record mark is a wobble mark having predetermined length and amplitude.

30. A recording medium according to claim 26, wherein said record mark comprises a wobbled portion wherein said groove portion and said land portion on said recording medium are wobbled at a predetermined position on said recording medium.

31. A recording medium according to claim 26, wherein said record mark comprises a smoothly displaced portion wherein said groove portion and said land portion on said recording medium are smoothly displaced at a predetermined position on said recording medium.

32. A tracking method used for one of recording on and reproducing from a recording medium having a recording track including a groove portion forming a continuous spiral having a plurality of turns on a recording surface and a land portion located between adjacent segments of said groove portion, comprising the steps of:
 forming a wobbled record mark on one of said groove portion and said land portion;
 detecting said record mark;
 switching recording or reproduction from one of said land portion and said groove portion in response to detecting said record mark by jumping from the continuous spiral of said one of said land portion and said groove portion to the continuous spiral of the other one of said land portion and said groove portion; and
 carrying out tracking by alternately irradiating said light beam on said groove portion and said land portion.

33. An optical recording/reproduction method, comprising the steps of:
 forming a wobbled record mark and a recording track on a recording medium;
 irradiating a light beam on said recording medium having said recording track and said record mark, said track including a groove portion forming a continuous spiral having a plurality of turns on a recording surface and a land portion located between adjacent segments of said groove portion;
 recording/reproducing information on/from each of a groove portion and a land portion;
 detecting said record mark; and
 switching between said groove portion and said land portion, alternately, in response to detecting said record mark.

34. An optical recording/reproduction method according to claim 33, further comprising the steps of:
 outputting a synchronization signal synchronized with rotation of said recording medium; and
 effecting a track jump at a predetermined position on said recording medium based on said synchronization signal.

35. An optical recording/reproduction method according to claim 33, further comprising:
 effecting a track jump at a specific position on said recording medium.

36. An optical recording/reproduction method according to claim 34, wherein said effecting step includes the step of effecting the track jump in response to a detection output from said mark detecting means.

37. An optical recording/reproduction method according to claim 33, wherein said record mark comprises a wobbled portion wherein said groove portion and said land portion on said recording medium are wobbled at a predetermined position on said recording medium.

38. An optical recording/reproduction method according to claim 33, wherein said record mark comprises a smoothly displaced portion wherein said groove portion and said land portion on said recording medium are smoothly displaced at a predetermined position on said recording medium.

39. An optical reproducing apparatus, comprising:

a recording medium having a recording track and a record mark, said record mark having a radially offset portion, said track including a groove portion forming a continuous spiral having a plurality of turns on a recording surface and a land portion located between adjacent segments of said groove portion, information being recorded on each of said groove portion and said land portion on said recording medium;

an optical pickup for irradiating a light beam on said recording medium and reproducing said information recorded on said each of said groove portion and said land portion;

means for detecting said record mark; and means for alternately switching said irradiating means between said groove portion and said land portion in response to detection of said record mark.

40. An optical reproducing apparatus according to claim 39, further comprising:

means for outputting a synchronization signal synchronized with rotation of said recording medium; and changeover means for effecting a track jump at a predetermined position on said recording medium based on said synchronization signal.

41. An optical reproducing apparatus according to claim 39, further comprising:

changeover means for effecting a track jump at a specific position on said recording medium.

42. An optical reproducing apparatus according to claim 40, wherein said changeover means effects the track jump in response to a detection output from said mark detecting means.

43. An optical reproducing apparatus according to claim 39, wherein said record mark comprises a wobbled portion wherein said groove portion and said land portion on said recording medium are wobbled at a predetermined position on said recording medium.

44. An optical reproducing apparatus according to claim 39, wherein said record mark comprises a smoothly displaced portion wherein said groove portion and said land portion on said recording medium are smoothly displaced at a predetermined position on said recording medium.

45. A recording medium, comprising:

a recording track including a groove portion forming a continuous spiral having a plurality of turns on a recording surface and a land portion located between adjacent segments of said groove portion; and a record mark having a radially offset portion, wherein information is recorded on each of said land portion and said groove portion by positioning an optical pickup to irradiate a light beam at a target track position, and wherein switching between said groove portion and said land portion occurs when said record mark is irradiated.

46. A recording medium according to claim 45, comprising:

a portion at a predetermined position where a track jump operation is carried out on said recording medium in synchronization with rotation of said recording medium.

47. A recording medium according to claim 45, comprising:

a portion at a predetermined position where a track jump operation is carried out.

48. A recording medium according to claim 45, wherein said record mark is a wobble mark having predetermined length and amplitude.

49. A recording medium according to claim 45, wherein said record mark comprises a wobbled portion wherein said groove portion and said land portion on said recording medium are wobbled at a predetermined position on said recording medium.

50. A recording medium according to claim 45, wherein said record mark comprises a smoothly displaced portion wherein said groove portion and said land portion on said recording medium are smoothly displaced at a predetermined position on said recording medium.

51. A tracking method used for one of recording on and reproducing from a recording medium having a recording track including a groove portion forming a continuous spiral having a plurality of turns on a recording surface and a land portion located between adjacent segments of said groove portion, comprising the steps of: forming a record mark having a radially offset portion on one of said groove portion and said land portion;

detecting said record mark;

switching recording or reproduction from one of said land portion and said groove portion in response to detecting said record mark by jumping from the continuous spiral of said one of said land portion and said groove portion to the continuous spiral of the other one of said land portion and said groove portion; and carrying out tracking by alternately irradiating said light beam on said groove portion and said land portion.

52. An optical recording/reproduction method, comprising the steps of:

forming a record mark having a radially displaced portion and a recording track on a recording medium;

irradiating a light beam on said recording medium having said recording track and said record mark, said track including a groove portion forming a continuous spiral having a plurality of turns on a recording surface and a land portion located between adjacent segments of said groove portion;

recording/reproducing information on/from each of a groove portion and a land portion;

detecting said record mark; and switching between said groove portion and said land portion, alternately, in response to detecting said record mark.

53. An optical recording/reproduction method according to claim 52, further comprising the steps of:

outputting a synchronization signal synchronized with rotation of said recording medium; and effecting a track jump at a predetermined position on said recording medium based on said synchronization signal.

54. An optical recording/reproduction method according to claim 52, further comprising:

effecting a track jump at a specific position on said recording medium.

55. An optical recording/reproduction method according to claim 53, wherein said effecting step includes the step of effecting the track jump in response to a detection output from said mark detecting means.

56. An optical recording/reproduction method according to claim 52, wherein said record mark comprises a wobbled portion wherein said groove portion and said land portion on said recording medium are wobbled at a predetermined position on said recording medium.

57. An optical recording/reproduction method according to claim 52, wherein said record mark comprises a smoothly displaced portion wherein said groove portion and said land portion on said recording medium are smoothly displaced at a predetermined position on said recording medium.

* * * * *